US012671630B2

(12) United States Patent　　　(10) Patent No.:　US 12,671,630 B2

Kumar et al.　　　　　　　　　　　(45) Date of Patent:　Jun. 30, 2026

(54) METHOD AND PAN DEVICE FOR MANAGING PAN DEVICES IN CLUSTER

(71) Applicant: Samsung Electronics Co., Ltd., Suwon-si (KR)

(72) Inventors: Prabhat Kumar, Noida (IN); Abhishek Saxena, Noida (IN); Abhinav Jain, Noida (IN); Anand Asati, Noida (IN); Amit Jain, Noida (IN); Nitesh Suthar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 18/329,303

(22) Filed: Jun. 5, 2023

(65) Prior Publication Data

US 2023/0318924 A1　　Oct. 5, 2023

Related U.S. Application Data

(63) Continuation of application No. PCT/KR2022/011332, filed on Aug. 1, 2022.

(30) Foreign Application Priority Data

Aug. 2, 2021　(IN) .............................. 202141034631

(51) Int. Cl.
H04L 41/12　　　(2022.01)
H04L 41/0803　　(2022.01)
(Continued)

(52) U.S. Cl.
CPC .......... H04L 41/12 (2013.01); H04L 41/0803 (2013.01); H04L 47/12 (2013.01); H04W 56/001 (2013.01); H04W 72/044 (2013.01)

(58) Field of Classification Search
CPC ..... H04L 41/12; H04L 41/0803; H04L 47/12; H04W 56/001; H04W 72/044;
(Continued)

(56) References Cited

U.S. PATENT DOCUMENTS

| 9,049,578 B2 | 6/2015 | Abraham et al. |
| 9,525,938 B2 | 12/2016 | Deshpande et al. |

(Continued)

FOREIGN PATENT DOCUMENTS

| KR | 20160045062 A | 4/2016 |
| KR | 20170013259 A | 2/2017 |
| WO | 2019034154 A1 | 2/2019 |

OTHER PUBLICATIONS

International Search Report for PCT/KR2022/011332 mailed Nov. 1, 2022, 4 pages.

(Continued)

*Primary Examiner* — Derrick W Ferris
*Assistant Examiner* — M Mostazir Rahman
(74) *Attorney, Agent, or Firm* — Nixon & Vanderhye P.C.

(57) ABSTRACT

A 5G or 6G communication system for supporting a higher data transmission rate in certain example instances. Certain example embodiments may provide a method for managing PAN devices in a cluster using a first PAN device in the cluster of the PAN devices. The method may include receiving an input comprising an inner cluster attribute from a user. The method may include determining that the first PAN device has the inner cluster attribute. The method may include determining whether an inner cluster corresponding to the inner cluster attribute is available under the cluster, where the inner cluster comprises a subset of the PAN devices with the inner cluster attribute. The method may include joining the inner cluster, in response to determining that the inner cluster is available under the cluster. The (Continued)

Wi-Fi channels in the 2.4 Ghz band of 1st NAN device (101)
Wi-Fi channels in the 2.4 Ghz band of 2nd NAN device (102)

Time

| Channel 1 | Channel 1 |
| Channel 2 | Channel 2 |
| Channel 3 | Channel 3 |
| Channel 4 | Channel 4 |
| Channel 5 | Channel 5 |
| Channel 6 | Channel 6 |
| 4 ms Channel 7 | Channel 7 |
| Channel 8 | Channel 8 |
| Channel 9 | Channel 9 |
| Channel 10 | Channel 10 |
| Channel 11 | Channel 11 |
| Channel 12 | Channel 12 |
| Channel 13 | Channel 13 | method may include creating the inner cluster, in response to determining that the inner cluster is not available under the cluster.

16 Claims, 18 Drawing Sheets

(51) Int. Cl.
| | |
|---|---|
| *H04L 47/12* | (2022.01) |
| *H04W 56/00* | (2009.01) |
| *H04W 72/044* | (2023.01) |

(58) Field of Classification Search
CPC ..... H04W 12/63; H04W 12/76; H04W 12/55; H04W 84/12; H04W 84/18; H04W 4/80
See application file for complete search history.

(56) References Cited

U.S. PATENT DOCUMENTS

| | | | |
|---|---|---|---|
| 9,756,603 | B2 | 9/2017 | Patil et al. |
| 10,193,933 | B2 | 1/2019 | Abraham et al. |
| 10,278,150 | B2 | 4/2019 | Abraham et al. |
| 10,412,776 | B2 | 9/2019 | Fujimori |
| 10,455,400 | B2 | 10/2019 | Patil et al. |
| 10,548,070 | B2 | 1/2020 | Huang et al. |
| 2016/0219423 | A1 | 7/2016 | Lee et al. |
| 2016/0226928 | A1 | 8/2016 | Park et al. |
| 2016/0241433 | A1* | 8/2016 | Huang .................. H04W 48/16 |
| 2016/0286476 | A1* | 9/2016 | Patil ...................... H04W 40/32 |
| 2016/0353368 | A1 | 12/2016 | Fang et al. |
| 2017/0094496 | A1* | 3/2017 | Aoki ...................... H04W 8/005 |
| 2017/0325230 | A1* | 11/2017 | Abraham .............. H04W 76/14 |
| 2018/0041946 | A1* | 2/2018 | Park ........................ H04L 9/088 |
| 2018/0054789 | A1 | 2/2018 | Abraham et al. |
| 2018/0109952 | A1 | 4/2018 | Abraham et al. |
| 2018/0206283 | A1* | 7/2018 | Fujimori ................ H04W 4/08 |
| 2019/0021050 | A1* | 1/2019 | Uno ...................... H04W 88/08 |
| 2019/0174400 | A1* | 6/2019 | Park ...................... H04W 48/16 |
| 2019/0357308 | A1* | 11/2019 | Kurian ............. H04W 72/0446 |
| 2020/0322872 | A1 | 10/2020 | Jung |
| 2021/0051462 | A1 | 2/2021 | Choi et al. |
| 2021/0127244 | A1 | 4/2021 | Choi et al. |

OTHER PUBLICATIONS

Written Opinion of the ISA for PCT/KR2022/011332 mailed Nov. 1, 2022, 4 pages.
Office Action for IN 202141034631 dated Mar. 7, 2023, 6 pages.

* cited by examiner

405

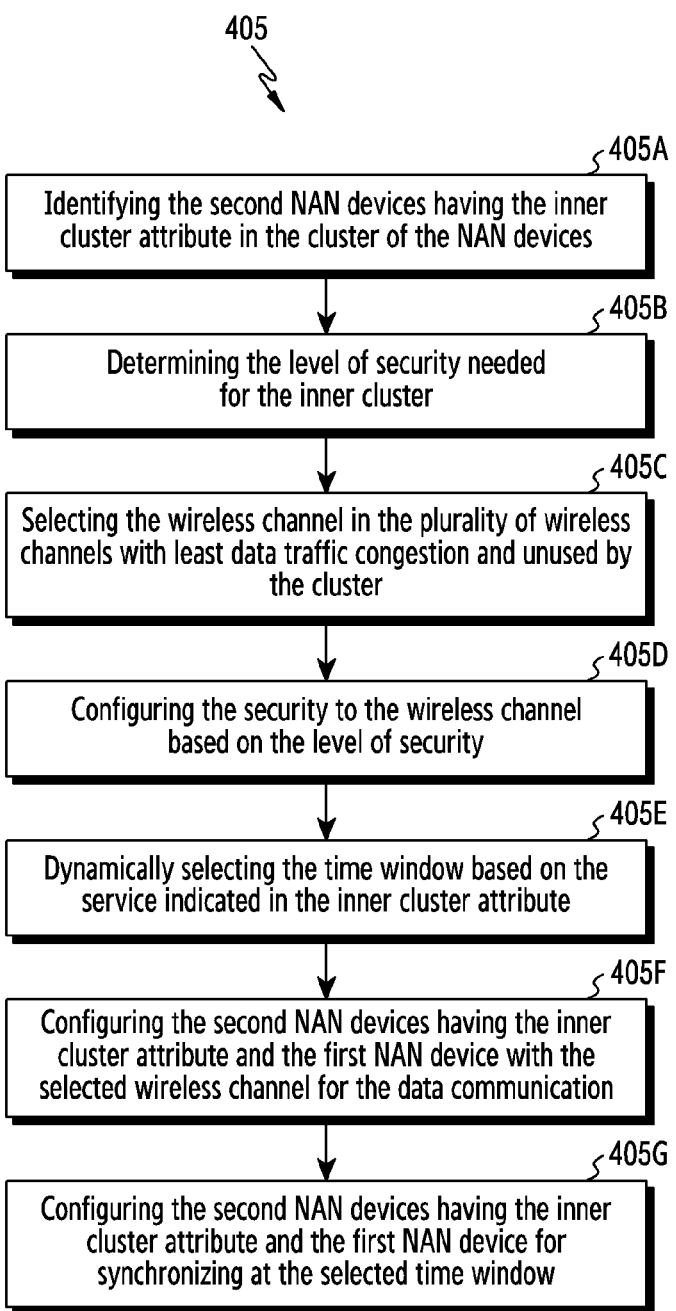

405A
Identifying the second NAN devices having the inner
cluster attribute in the cluster of the NAN devices 405B
Determining the level of security needed
for the inner cluster 405C
Selecting the wireless channel in the plurality of wireless
channels with least data traffic congestion and unused by
the cluster 405D
Configuring the security to the wireless channel
based on the level of security 405E
Dynamically selecting the time window based on the
service indicated in the inner cluster attribute 405F
Configuring the second NAN devices having the inner
cluster attribute and the first NAN device with the
selected wireless channel for the data communication 405G
Configuring the second NAN devices having the inner
cluster attribute and the first NAN device for
synchronizing at the selected time window

FIG.3B

METHOD AND PAN DEVICE FOR MANAGING PAN DEVICES IN CLUSTER

CROSS-REFERENCE TO RELATED APPLICATIONS

This application is a continuation of International Application No. PCT/KR2022/011332, designating the United States, filed on Aug. 1, 2022, in the Korean Intellectual Property Receiving Office and claiming priority to IN Patent Application No. 202141034631, filed on Aug. 2, 2021, the disclosures of which are incorporated by reference herein in their entireties.

BACKGROUND

Field

The present disclosure relates to wireless communication, and for example to a method and a Proximity Awareness Networking (PAN) device (e.g. neighbour awareness networking device) for managing PAN devices in a cluster.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Certain example embodiments of the present disclosure may provide a method, and/or an apparatus, for selecting correct SMF for SNPN UE's onboarding in a wireless network.

According to an aspect of an exemplary embodiment, there is provided a communication method in a wireless communication.

Aspects of the present disclosure may provide efficient communication methods in a wireless communication system.

In an example embodiment, a 5G or 6G communication system is provided for supporting a higher data transmission rate in certain example instances. Certain example embodiments may provide a method for managing PAN devices in a cluster using a first PAN device in the cluster of the PAN devices. The method may include receiving an input comprising an inner cluster attribute from a user. The method may include determining that the first PAN device has the inner cluster attribute. The method includes determining whether an inner cluster corresponding to the inner cluster attribute is available under the cluster, where the inner cluster comprises a subset of the PAN devices with the inner cluster attribute. The method may include joining the inner cluster, in response to determining that the inner cluster is available under the cluster. The method may include creating the inner cluster, in response to determining that the inner cluster is not available under the cluster.

BRIEF DESCRIPTION OF THE DRAWINGS

Certain example embodiments are illustrated in the accompanying drawings, throughout which like reference letters indicate corresponding parts in the various figures. The embodiments herein will be better understood from the following description with reference to the drawings, in which:

FIG. 3B is a flow diagram illustrating a method for creating the inner cluster using the first NAN device, according to an example embodiment;

DETAILED DESCRIPTION

Figure 1:
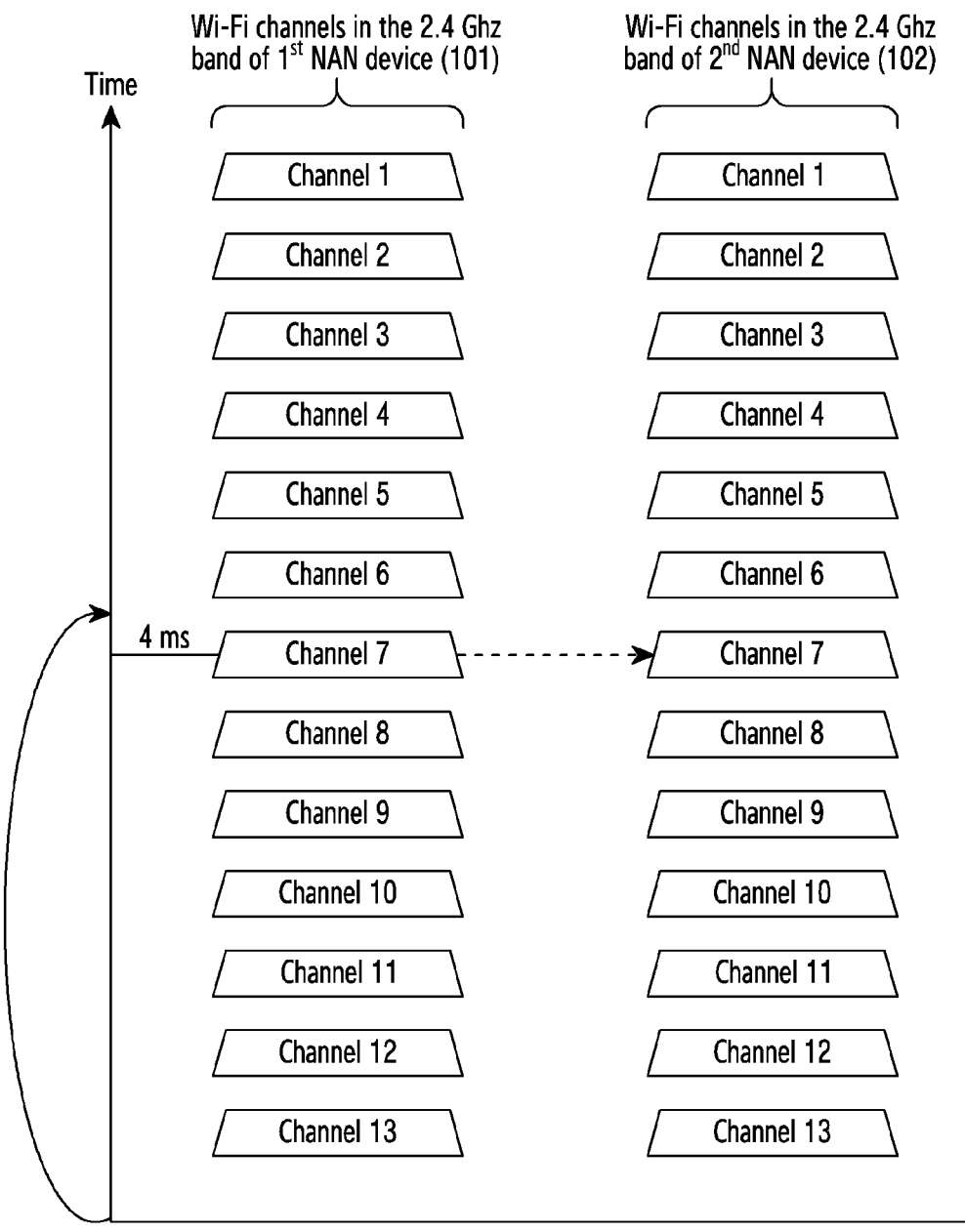
FIG. 1 is a schematic diagram illustrating an example scenario of assigning Wi-Fi channels to NAN devices, according to prior art.

Certain example embodiments herein provide a method for managing NAN devices in a cluster. The method may include receiving, by a first NAN device in the cluster of the NAN devices, an input comprising an inner cluster attribute from a user, where the inner cluster attribute indicates a service for the user. The method may include determining, by the first NAN device, that the first NAN device has the inner cluster attribute. The method may include determining, by the first NAN device, whether an inner cluster corresponding to the inner cluster attribute is available under the cluster, where the inner cluster comprises a subset of the NAN devices with the inner cluster attribute. The method may include joining, by the first NAN device, the inner cluster, in response to determining that the inner cluster corresponding to the inner cluster attribute is available under the cluster. The method may include creating, by the first NAN device, the inner cluster, in response to determining that the inner cluster corresponding to the inner cluster attribute is not available under the cluster.

In an example embodiment, where creating, by the first NAN device, the inner cluster, comprises identifying, by the first NAN device, at least one second NAN device having the inner cluster attribute in the cluster of the NAN devices, determining, by the first NAN device, a level of security needed or desired for the inner cluster, selecting, by the first NAN device, a wireless channel in a plurality of wireless channels with least data traffic congestion and unused by the cluster, configuring, by the first NAN device, a security to the wireless channel based on the level of security, dynamically selecting, by the first NAN device, a time window based on the service indicated in the inner cluster attribute, where the time window is unused by the cluster, configuring, by the first NAN device, at least one second NAN device having the inner cluster attribute and the first NAN device with the selected wireless channel for data communication, and configuring, by the first NAN device, the at least one second NAN device having the inner cluster attribute and the first NAN device for synchronizing at the selected time window.

In an example embodiment, where joining, by the first NAN device, the inner cluster, comprises selecting, by the first NAN device, a wireless channel in a plurality of wireless channels assigned to the inner cluster for data communication, and selecting, by the first NAN device, a time window assigned to the inner cluster for synchronizing at the selected time window.

In an example embodiment, where determining, by the first NAN device, whether the inner cluster corresponding to the inner cluster attribute is available under the cluster, comprises broadcasting, by the first NAN device, the inner cluster attribute to at least one second NAN device in the cluster of the NAN devices through a plurality of wireless channels, receiving, by the first NAN device, a response from the at least one second NAN device, where the response indicates whether the inner cluster attribute is present at the at least one second NAN device, performing, by the first NAN device, at least one of: determining that the inner cluster corresponding to the inner cluster attribute is available under the cluster when the inner cluster attribute is present at the at least one second NAN device, and determining that the inner cluster corresponding to the inner cluster attribute is not available under the cluster when the inner cluster attribute is not present at the at least one second NAN device.

In an example embodiment, where the NAN devices in the inner cluster are allowed to access information and services from the NAN devices in the cluster, where the NAN devices in the cluster are not allowed to access information and services from the NAN devices in the inner cluster.

Accordingly, certain example embodiments herein provide the first NAN device in the cluster of the NAN devices for managing the NAN devices. The first NAN device may include an inner cluster controller, a memory, a processor, where the inner cluster controller is coupled to the memory and the processor. The inner cluster controller is configured for receiving the input comprising the inner cluster attribute from the user, where the inner cluster attribute indicates the service needed or desired for the user. The inner cluster controller is configured for determining that the first NAN device has the inner cluster attribute. The inner cluster controller is configured for determining whether the inner cluster corresponding to the inner cluster attribute is available under the cluster, where the inner cluster comprises the subset of the NAN devices with the inner cluster attribute. The inner cluster controller is configured for joining the inner cluster, in response to determining that the inner cluster corresponding to the inner cluster attribute is available under the cluster. The inner cluster controller is configured for creating the inner cluster, in response to determining that the inner cluster corresponding to the inner cluster attribute is not available under the cluster.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments, and the embodiments herein include all such modifications.

Each embodiment herein may be used in combination with any other embodiment(s) herein. Wireless Fidelity (Wi-Fi) aware capability allows a Wi-Fi device to quickly discover, connect, and exchange data through a Wi-Fi connection. Wi-Fi aware capability is also called as Neighbour Awareness Networking (NAN), and a Wi-Fi aware capability enabled device is called as a NAN device. The NAN is a power efficient service discovery mechanism which allows a NAN device to discover services of neighboring NAN devices before initiating a connection with them. The NAN is designed to run in background in the NAN device and continuously scan to discover the neighboring NAN devices in proximity Upon finding the neighboring NAN devices in proximity, the NAN device creates a cluster including the current NAN device and the neighboring NAN devices and assigns an identifier to the cluster, i.e. cluster ID. The cluster is a collection of NAN devices that share a common set of NAN parameters and are synchronized to a same discovery window (i.e. time window). A time period and a wireless channel on which the NAN devices converge is called the discovery window.

FIG. 1 is a schematic diagram illustrating an example scenario of assigning wireless channel (i.e. Wi-Fi channel) to the NAN devices. Wi-Fi channels of a first NAN device (101) and Wi-Fi channels of a second NAN device (102) are shown in the FIG. 1. In order to create the cluster of the first and second NAN devices, both the NAN devices perform a scan on all available wireless channels (i.e. channel 1-channel 13) in a Wi-Fi spectrum. When same wireless channel (e.g. channel 7) is sensed between different the NAN devices, then they connect to each other through the sensed wireless channel. Further, the NAN devices choose the discovery window (4 milliseconds (ms)) for synchronization and perform data communication through the sensed wireless channel. The cluster is formed by configuring the NAN devices to the selected wireless channel and the discovery window. Due to random choosing the wireless channel, a set of NAN devices may choose same wireless channel for communication which introduces a data traffic congestion in the wireless channel.

As per existing protocol for the NAN, any new NAN device in the proximity to the current NAN devices in the cluster can join the cluster without authentication or verification. Therefore, an unknown NAN device can easily access the cluster by connecting to one of the NAN devices in the cluster and collect information of the NAN devices in cluster without any approval, which is a serious security threat in the NAN. Generally, the cluster is created by adding the NAN devices in proximity Therefore, the NAN device cannot be differentiated as a part of a particular cluster. For example, consider that a user wishes to create one cluster of the NAN devices in a drawing room and another cluster of the NAN devices in a kitchen. As per the existing protocol for the NAN, it is not possible to create a separate cluster for the drawing room and the kitchen if the devices in the drawing room and the kitchen are in proximity. Also, it is not possible to group similar NAN devices catering to one specific task to the separate cluster within the cluster. The NAN devices uses the discovery window of fixed size for all type of services, where a small discovery window is recommended to gaming applications for a quick response, and a large discovery window is enough for entertainment applications. Also, the NAN can be extended to other future wireless technologies that inherits the features of the NAN, which can be called as Proximity Awareness Networking (PAN). Thus, it is desired to provide a solution to the aforementioned problems in the existing protocol for the NAN which will be useful to the PAN also.

Certain example embodiments provide a method and a NAN device for managing NAN devices in a cluster. The NAN device creates the inner cluster under the cluster, where the cluster may include the NAN devices that provide a common service or the NAN devices that are present in a particular geographical location within a cluster region. The method improves a user experience in handling the NAN devices by allowing a user to choose a specific set of NAN devices by simply selecting the inner cluster.

Certain example embodiments reduce a data traffic congestion in the wireless channels of the cluster. The NAN device assigns a discovery window and a wireless channel to the inner cluster which are different from that of the cluster. Hence, the NAN devices that are present in the inner cluster communicates data or transmits/receives bacons through the wireless channel assigned to the inner cluster as per the discovery window assigned to the inner cluster. Moreover, each inner cluster in the cluster has separate wireless channel and the discovery window for data communication or transmitting/receiving bacons, which significantly reduces the data traffic congestion in the wireless channels of the cluster.

Certain example embodiments improve a security of the NAN devices in the cluster. The NAN devices present outside the inner cluster are not aware about the discovery window and the wireless channel of the inner cluster. Therefore, the NAN devices present outside the inner cluster can't access services and information providing by the NAN devices in the inner cluster, which improves the security of the NAN devices.

Certain example embodiments dynamically adjust the discovery window for discovering the NAN devices in the inner cluster based on the service needed and/or desired for the user. When a frequent discovery of the NAN devices in the inner cluster is needed or desired for a service (e.g. gaming) that requires a high speed control at low traffic, then the NAN devices in the inner cluster are configured with a smaller discovery window (e.g. 2 millisecond). Thus the NAN devices can quickly refresh without a latency in transmitting/receiving beacons between the NAN devices in the inner cluster.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The proposed solution in this disclose can be extended to other future wireless technologies in which features of the NAN inherit. The NAN extended to the other future wireless technologies is called as Proximity Awareness Networking (PAN).

Accordingly, the embodiments herein provide a method for managing PAN devices (e.g. NAN device) in a cluster. The method may include receiving, by a first PAN device (e.g. first NAN device), in the cluster of the PAN devices, an input comprising an inner cluster attribute from a user, wherein the inner cluster attribute indicates a service needed or desired for the user. The method may include determining, by the first PAN device, that the first PAN device has the inner cluster attribute. The method may include determining, by the first PAN device, whether an inner cluster corresponding to the inner cluster attribute is available under the cluster, wherein the inner cluster comprises a subset of the PAN devices with the inner cluster attribute. The method may include performing, by the first PAN device, at least one of joining the inner cluster, in response to determining that the inner cluster corresponding to the inner cluster attribute is available under the cluster, and creating the inner cluster, in response to determining that the inner cluster corresponding to the inner cluster attribute is not available under the cluster.

In an embodiment, where creating, by the first PAN device, the inner cluster, comprises identifying, by the first PAN device, at least one second PAN device (e.g. second NAN device) having the inner cluster attribute in the cluster of the PAN devices, determining, by the first PAN device, a level of security needed or desired for the inner cluster, selecting, by the first PAN device, a wireless channel in a plurality of wireless channels with least data traffic congestion and unused by the cluster, configuring, by the first PAN device, a security to the wireless channel based on the level of security, dynamically selecting, by the first PAN device, a time window based on the service indicated in the inner cluster attribute, wherein the time window is unused by the cluster, configuring, by the first PAN device, at least one second PAN device having the inner cluster attribute and the first PAN device with the selected wireless channel for data communication, and configuring, by the first PAN device, the at least one second PAN device having the inner cluster attribute and the first PAN device for synchronizing at the selected time window.

In an embodiment, where joining, by the first PAN device, the inner cluster, comprises selecting, by the first PAN device, a wireless channel in a plurality of wireless channels assigned to the inner cluster for data communication, and selecting, by the first PAN device, a time window assigned to the inner cluster for synchronizing at the selected time window.

In an embodiment, where determining, by the first PAN device, whether the inner cluster corresponding to the inner cluster attribute is available under the cluster, comprises broadcasting, by the first PAN device, the inner cluster attribute to at least one second PAN device in the cluster of the PAN devices through a plurality of wireless channels, receiving, by the first PAN device, a response from the at least one second PAN device, wherein the response indicates whether the inner cluster attribute is present at the at least one second PAN device, and performing, by the first PAN device, at least one of determining that the inner cluster corresponding to the inner cluster attribute is available under the cluster when the inner cluster attribute is present at the at least one second PAN device, and determining that the inner cluster corresponding to the inner cluster attribute is not available under the cluster when the inner cluster attribute is not present at the at least one second PAN device.

In an embodiment, where the PAN devices in the inner cluster are allowed to access information and services from the PAN devices in the cluster, wherein the PAN devices in the cluster are not allowed to access information and services from the PAN devices in the inner cluster.

Standard terms used in existing specification of NAN, and definition of the standard terms are given below.

NAN Beacon: A NAN Beacon includes of all NAN Discovery Beacon and NAN Synchronization Beacon frames.

NAN Cluster: A collection of NAN devices that are synchronized to the same Discovery Window schedule.

NAN Concurrent Device: A NAN Device that is capable of operating in a NAN network and other types of Wi-Fi networks such as WLAN infrastructure, IBSS, and Wi-Fi Direct.

NAN Device: Any device that implements the NAN protocol.

NAN Discovery Beacon: A modified IEEE 802.11 Beacon management frame transmitted outside NAN Discovery Windows to facilitate discovery of NAN Clusters.

NAN Discovery Channel: The 2.4 GHz channel, and optionally a 5 GHz channel, on which NAN Discovery operations occur.

NAN Discovery Engine: The part of the NAN stack that implements the Publish and Subscribe mechanisms.

NAN Discovery Window: The time and channel on which NAN Devices converge.

NAN ID: An identifier signifying a specific set of NAN parameters.

NAN Infrastructure Device: A NAN Device whose default Master Preference setting is greater than or equal to 128 and intends to be a NAN Master Device.

NAN Network: A collection of NAN Clusters that share the same NAN ID.

Accordingly, the embodiments herein provide a method for managing the NAN devices in a cluster. The method may include receiving, by the first NAN device in the cluster of the NAN devices, an input comprising an inner cluster attribute from a user, where the inner cluster attribute indicates a service needed or desired for the user. The method may include determining, by the first NAN device, that the first NAN device has the inner cluster attribute. The method may include determining, by the first NAN device, whether an inner cluster corresponding to the inner cluster attribute is available under the cluster, where the inner cluster comprises a subset of the NAN devices with the inner cluster attribute. The method may include joining, by the first NAN device, the inner cluster, in response to determining that the inner cluster corresponding to the inner cluster attribute is available under the cluster. The method may include creating, by the first NAN device, the inner cluster, in response to determining that the inner cluster corresponding to the inner cluster attribute is not available under the cluster.

Accordingly, the embodiments herein provide the first NAN device in the cluster of the NAN devices for managing the NAN devices. The first NAN device may include an inner cluster controller, a memory, a processor, where an inner cluster controller is coupled to the memory and the processor. The inner cluster controller is configured for receiving the input comprising the inner cluster attribute from the user, where the inner cluster attribute indicates the service needed for the user. The inner cluster controller is configured for determining that the first NAN device has the inner cluster attribute. The inner cluster controller is configured for determining whether the inner cluster corresponding to the inner cluster attribute is available under the cluster, where the inner cluster comprises the subset of the NAN devices with the inner cluster attribute. The inner cluster controller is configured for joining the inner cluster, in response to determining that the inner cluster corresponding to the inner cluster attribute is available under the cluster. The inner cluster controller is configured for creating the inner cluster, in response to determining that the inner cluster corresponding to the inner cluster attribute is not available under the cluster.

Unlike existing methods and systems, the first NAN device assigns a discovery window and a wireless channel to the inner cluster different from that of the cluster. Hence, the NAN devices that are present in the inner cluster communicates data or transmits/receives bacons through the wireless channel assigned to the inner cluster as per the discovery window assigned to the inner cluster. Moreover, each inner cluster in the cluster has separate wireless channel and the discovery window for data communication or transmitting/receiving bacons, which significantly reduces a data traffic congestion in the wireless channels.

The NAN devices present outside the inner cluster are not aware about the discovery window and the wireless channel of the inner cluster. Therefore, the NAN devices present outside the inner cluster can't access services and information providing by the NAN devices in the inner cluster, which improves a security of the inner cluster.

In response to receiving the input from the user, the first NAN device creates or joins the inner cluster under the cluster based on common services providing by the NAN devices in the cluster or the NAN devices in a particular geographical location in a cluster region (i.e. a region of coverage of the cluster). The method improves a user experience in handling the NAN devices by allowing the user to choose a specific set of NAN devices by simply selecting the inner cluster.

Unlike existing methods and systems, the first NAN device dynamically adjusts the discovery window for discovery of the NAN devices in the inner cluster based on the service needed for the user. When a frequent discovery of the NAN devices in the inner cluster is needed for a service (e.g. gaming) that requires a high speed control at low traffic, then the NAN devices in the inner cluster are configured with a smaller discovery window (e.g. 2 millisecond). Thus the NAN devices can quickly refresh without a latency in transmitting/receiving beacons between the NAN devices in the inner cluster.

Referring now to the drawings, and more particularly to FIGS. 2A through 11, there are shown preferred embodiments.

Figure 2A:
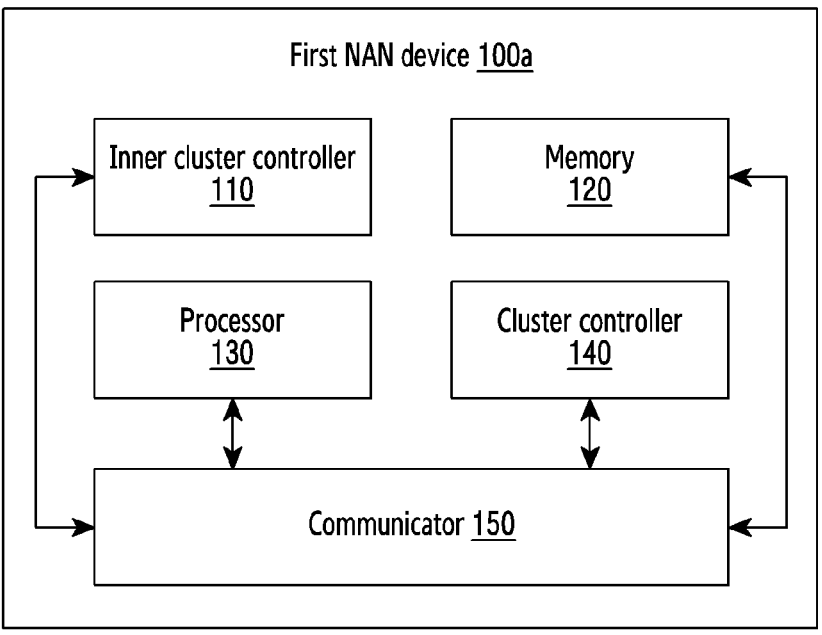
FIG. 2A is a block diagram of a NAN device for managing the NAN devices in a cluster, according to an example embodiment.

FIG. 2A is a block diagram of a first NAN device (100a) for managing NAN devices (100a-100j) in a cluster (e.g. see cluster 300 in FIGS. 4A-4D), according to an embodiment as disclosed herein. Refer FIG. 4D for understanding arrangements of an inner cluster (200a). The inner cluster (200a) includes the first NAN device (100a) and second NAN devices (100b-100c) inside the cluster (300) of the NAN devices (100a-100j). In an embodiment, the NAN devices (100a-100b) in the inner cluster (200a) are allowed to access information and services from the NAN devices (100h-100j) in the cluster (300), whereas the NAN devices (100*h*-100*j*) in the cluster (300) are not allowed to access information and services from the NAN devices (e.g., 100*a*-100*b*) in the inner cluster (200*a*). Examples of the NAN devices (100*a*-100*j*) include, but not limited to a smart phone, a tablet computer, a personal digital assistance (PDA), a desktop computer, a wearable device, a gaming device, an Augmented Reality (AR) device, a Virtual Reality (VR) device, an Internet of Things (IoT), etc.

In an embodiment, the first NAN device (100*a*) includes an inner cluster controller (110), a memory (120), a processor (130), a cluster controller (140) and a communicator (150). Each of the NAN device (100*b*-100*j*) comprises similar hardware components of the first NAN device (100*a*). The inner cluster controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The inner cluster controller (110) is configured for receiving an input including an inner cluster attribute from a user. The inner cluster attribute indicates a service needed for the user. In an embodiment, the inner cluster attribute indicates a type of devices suitable to provide the service or a type of devices that are located in a geographical area suitable to provide the service. Examples of the service needed for the user include, but are not limited to, gaming, music, cooking, messaging, etc. Examples of the type of devices suitable to provide the service include, but are not limited to wearable devices (e.g. smart band, smart watch, smart goggle), AR/VR devices (e.g. AR glass), music playing devices (e.g. smart speaker, wireless speaker), display devices (e.g. television, projector).

Examples of the type of devices that are located in the geographical suitable to provide the service includes, but not limited to bedroom appliances (e.g. air conditioner, color bulbs), kitchen appliances (e.g. washing machine, mixer grinder, white bulbs). The inner cluster controller (110) is configured for determining that the first NAN device (100*a*) has the inner cluster attribute. The inner cluster controller (110) is configured for determining whether the inner cluster (200*a*) corresponding to the inner cluster attribute is available under the cluster (300). The inner cluster (200*a*) includes a subset of the NAN devices (e.g., 100*a*-100*j*) with the inner cluster attribute.

In an embodiment, the inner cluster controller (e.g., 110) is configured for broadcasting the inner cluster attribute to second NAN devices (e.g., 100*b*-100*j*) in the cluster (e.g., 300) of the NAN devices (e.g., 100*a*-100*j*) through a plurality of wireless channels (e.g., Wi-Fi channels). In response to receiving the inner cluster attribute, the second NAN devices (e.g., 100*b*-100*j*) sends a response indicating whether the inner cluster attribute is present at the second NAN devices (e.g., 100*b*-100*j*), to the first NAN device (100*a*). The inner cluster controller (e.g., 110) is configured for receiving the response from the second NAN devices (e.g., 100*b*-100*j*).

The inner cluster controller (e.g., 110) is configured for determining that the inner cluster (e.g., 200*a*) corresponding to the inner cluster attribute is available under the cluster (e.g., 300) when the inner cluster attribute is present at the second NAN devices (e.g., 100*b*-100*j*). The inner cluster controller (110) is configured for determining that the inner cluster (e.g., 200*a*) corresponding to the inner cluster attribute is not available under the cluster (300) when the inner cluster attribute is not present at the second NAN devices (e.g., 100*b*-100*j*).

The inner cluster controller (110) is configured for joining the inner cluster (200*a*), in response to determining that the inner cluster (200*a*) corresponding to the inner cluster attribute is available under the cluster (300). In an embodiment, the inner cluster controller (110) is configured for selecting a wireless channel in the plurality of wireless channels assigned to the inner cluster (200*a*) for data communication. Further, the inner cluster controller (110) is configured for selecting a time window (interchangeably written as discovery window) assigned to the inner cluster (200*a*) for sending discovery frames to second NAN devices (e.g., 100*b*-100*c* or 100*b*-100*j*) having the inner cluster attribute and thus synchronizing with the second NAN devices (100*b*-100*c*) at the selected time window.

The inner cluster controller (110) is configured for creating the inner cluster (200*a*), in response to determining that the inner cluster (200*a*) corresponding to the inner cluster attribute is not available under the cluster (300). In an embodiment, the inner cluster controller (110) is configured for identifying the second NAN device (100*b*-100*c*) having the inner cluster attribute in the cluster (300) of the NAN devices (100*a*-100*j*). The inner cluster controller (110) is configured for determining a level of security needed for the inner cluster (200*a*). Examples of the level of security includes, but not limited to a high level security, a medium level security, and a low level security.

In an embodiment, the level of security is determined based on the inner cluster attribute. For example, consider the service indicated in the inner cluster attribute is messaging. Messaging requires high security due to presence of sensitive information such as user personal details in the message. Therefore, the inner cluster controller (110) is configured for choosing the high level security for messaging. Consider the service indicated in the inner cluster attribute is music. Therefore, the inner cluster controller (110) is configured for choosing the low level security for music.

In another example, consider the type of devices indicated in the inner cluster attribute are the wearable devices. Wearable devices require high security due to handling the sensitive information such as user personal details. Therefore, the inner cluster controller (110) is configured for choosing the high level security for the wearable devices. Consider the type of devices indicated in the inner cluster attribute are the music playing devices. The music playing devices require low security due to not handling the sensitive information. Therefore, the inner cluster controller (110) is configured for choosing the low level security for the music playing devices.

The inner cluster controller (110) is configured for selecting the wireless channel in a plurality of wireless channels with least data traffic congestion and unused by the cluster (300). The inner cluster controller (110) is configured for configuring a security to the wireless channel based on the level of security. For example, when the high level security is needed for the wireless channel, then the inner cluster controller (110) secures the wireless channel using an encryption method. When the low level security is needed only for the wireless channel, the inner cluster controller (110) allows the data communication through the wireless channel without any security mechanism.

The inner cluster controller (110) is configured for dynamically selecting the time window based on the service indicated in the inner cluster attribute. In an embodiment, the time window should be unused by the cluster (300) while selecting the time window for the inner cluster (200*a*). When the inner cluster attribute indicates the service such as messaging that requires high security, or gaming that requires quick refresh rate, then the inner cluster controller (110) chooses a smaller time window for quick responses. This is because media content usually streamed over a media playing device and a delay in discovery of the media playing device often does not affect the playing of the media content. For example, when the inner cluster attribute indicates the service such as music, then the inner cluster controller (110) chooses a larger time window for delayed response and avoiding the data traffic congestion.

The inner cluster controller (110) is configured for configuring the second NAN device (e.g., 100*b*-100*c* or 100*b*-100*j*) having the inner cluster attribute and the first NAN device (100*a*) with the selected wireless channel for the data communication. The inner cluster controller (110) is configured for configuring the second NAN device (e.g., 100*b*-100*c*) having the inner cluster attribute and the first NAN device (100*a*) for sending the discovery frames to the second NAN devices (e.g., 100*b*-100*c*) having the inner cluster attribute and thus synchronizing with the second NAN devices (e.g., 100*b*-100*c*) at the selected time window.

The memory (120) stores the inner cluster attribute, a cluster ID and an identifier of the inner cluster (200*a*). The memory (120) stores instructions to be executed by the processor (130) which includes processing circuitry. The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EE-PROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the first NAN device (100*a*), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. Each processor herein includes processing circuitry.

The cluster controller (140) is configured for creating the cluster (300) of the NAN devices (100*a*-100*j*). The communicator (150) is configured for communicating internally between hardware components in the first NAN device (100*a*). Further, the communicator (150) is configured to facilitate the communication between the first NAN device (100*a*) and other devices via one or more networks (e.g. Radio technology). The communicator (150) includes an electronic circuit specific to a standard that enables wired or wireless communication.

Although the FIG. 2A shows the hardware components of the first NAN device (100*a*) it is to be understood that other embodiments are not limited thereon. In other embodiments, the first NAN device (100*a*) may include less or more number of components. Further, the labels or names of the components are used only for illustrative purpose and do not limit the scope of the invention. One or more components can be combined together to perform same or substantially similar function for managing the NAN devices (100*a*-100*j*) in the cluster (300).

Figure 2B:
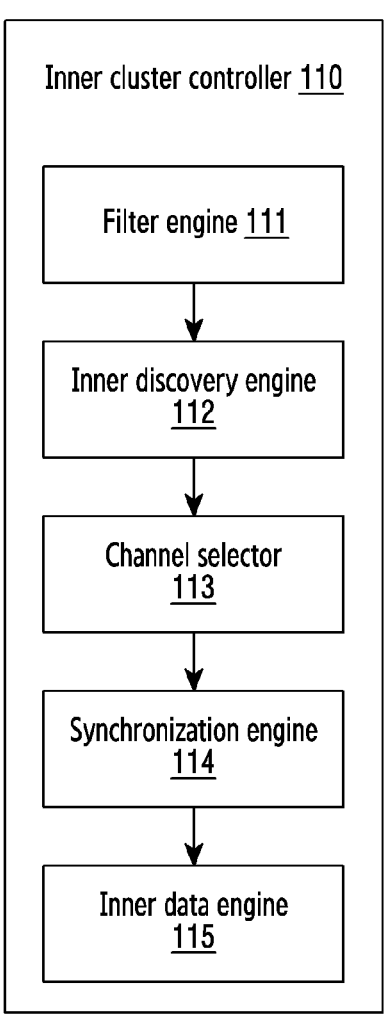
FIG. 2B is a block diagram of an inner cluster controller for joining or creating an inner cluster, according to an example embodiment.

FIG. 2B is a block diagram of the inner cluster controller (110) for joining or creating the inner cluster (200*a*), according to an embodiment as disclosed herein. In an embodiment, the inner cluster controller (110) includes a filter engine (111), an inner discovery engine (112), a channel selector (113), a synchronization engine (114), and an inner data engine (115). The filter engine (111), the inner discovery engine (112), the channel selector (113), the synchronization engine (114), and the inner data engine (115) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The filter engine (111) receives the input including the inner cluster attribute from the user. The filter engine (111) determines that the first NAN device (100*a*) has the inner cluster attribute. In another embodiment, the filter engine (111) receives the input from applications installed in the first NAN device (100*a*) to find and join the inner cluster (200*a*) when the inner cluster (200*a*) is already present under the cluster (300), or create and join the inner cluster (200*a*) when the inner cluster (200*a*) is not present under the cluster (300).

The inner discovery engine (112) determines whether the inner cluster (200*a*) corresponding to the inner cluster attribute is available under the cluster (300). In an embodiment, the inner discovery engine (112) broadcasts a message (e.g. NAN synchronization beacon, a publish message) including the inner cluster attribute to the second NAN devices (e.g., 100*b*-100*j*) in the cluster (e.g., 300) through the plurality of wireless channels for discovering the NAN devices (e.g., 100*b*-100*c*) of the inner cluster (e.g., 200*a*). In an example, the second NAN devices (e.g., 100*b*-100*c*) for the inner cluster (200*a*) are discovered through a wireless channel 6 with frequency 2.437 GHz in 2.4 GHz frequency band of Wi-Fi. In another example, a wireless channel with a frequency under 5 GHz can be used in 5 GHz frequency band of Wi-Fi for discovering the NAN devices (e.g., 100*a*-100*b*). Other NAN operations are performed in other wireless channels of the plurality of wireless channels.

In response to receiving the inner cluster attribute, a filter engine of the second NAN devices (e.g., 100*b*-100*j*) determines whether the inner cluster attribute is present at the second NAN devices (100*b*-100*j*). Further, a channel selector of at least one of the second NAN devices (100*b*-100*j*) may send the response to indicate whether the inner cluster attribute is present at one or more of the second NAN devices (e.g., 100*b*-100*j*) to the first NAN device (e.g., 100*a*). The channel selector and the filter engine of the second NAN devices (100*b*-100*j*) operates similar as the channel selector (113) and the filter engine (111) respectively.

The inner discovery engine (112) receives the response from the second NAN devices (100*b*-100*j*). The inner discovery engine (112), determines that the inner cluster (200*a*) corresponding to the inner cluster attribute is available under the cluster (300) when the inner cluster attribute is present at the second NAN devices (100*b*-100*j*). The inner discovery engine (112) determines that the inner cluster (200*a*) corresponding to the inner cluster attribute is not available under the cluster (300) when the inner cluster attribute is not present at the second NAN devices (100*b*-100*j*). The inner discovery engine (112) identifies the second NAN device (100*b*-100*c*) having the inner cluster attribute in the cluster (300) of the NAN devices (100*a*-100*j*). The inner discovery engine (112) determines the level of security needed for the inner cluster (200*a*).

The inner discovery engine (112) discovers the NAN devices (100*a*-100*c*) of the inner cluster (200*a*) and the NAN devices (100*a*-100*j*) present in the cluster (300) for deciding about the discovery window (i.e. time window) for synchronization using the synchronization engine (114). Functionalities of the inner discovery engine (112) include subscribe, publish, and follow-up primitives. NAN control primitives may carry information related to the NAN inner discovery functionality.

The channel selector (113) selects the wireless channel in the plurality of wireless channels assigned to the inner cluster (200*a*) for the data communication. The channel selector (113) selects the wireless channel in the plurality of wireless channels with least data traffic congestion and/or unused by the cluster (300). The channel selector (113) configures the security to the wireless channel based on the level of security. The synchronization engine (114) dynamically selects the time window based on the service indicated in the inner cluster attribute, where the inner cluster (100*a*) is configured with the dynamic timing window for the synchronization of the NAN devices (100*a*-100*c*) in the inner cluster (200*a*).

The synchronization engine (114) selects the time window to the inner cluster (200*a*) for sending the discovery frames to the second NAN devices (100*b*-100*c*) having the inner cluster attribute and thus maintains synchronization of the NAN devices (100*a*-100*c*) in the inner cluster (200*a*) at the selected time window. The NAN synchronization procedure specifies the time window and limits a number of wireless channels to decrease a discovery latency, power consumption, and medium occupancy that would otherwise occur. The synchronization engine (114) obtains preliminary data including inner cluster attribute from the filter engine (111), a time window for synchronization of NAN devices (100*a*-100*j*) of the cluster (300), and the wireless channel of the cluster (300) and the inner cluster (200*a*). Further, the synchronization engine (114) calculates the time window of the inner cluster (200*a*) based on the preliminary data, and sends the time window to the inner data engine (115).

The inner data engine (115) configures the first NAN device (100*a*) to join the inner cluster (200*a*), in response to determining that the inner cluster (200*a*) corresponding to the inner cluster attribute is available under the cluster (300). The inner data engine (115) configures the first NAN device (100*a*) to create the inner cluster (200*a*), in response to determining that the inner cluster (200*a*) corresponding to the inner cluster attribute is not available under the cluster (300). The inner data engine (115) configures the second NAN device (100*b*-100*c*) having the inner cluster attribute and the first NAN device (100*a*) with the selected wireless channel for the data communication. The inner data engine (115) configures the second NAN device (100*b*-100*c*) having the inner cluster attribute and the first NAN device (100*a*) for sending the discovery frames to the second NAN devices (100*b*-100*c*) having the inner cluster attribute and thus synchronizing with the second NAN devices (100*b*-100*c*) at the selected time window.

The inner data engine (115) establishes or negotiates the communication among the NAN devices (100*a*-100*c*) of the inner cluster (200*a*). When the service requires a data path support, the inner data engine (115) instructs the inner discovery engine (112) to include the inner cluster attribute in all published messages by setting a data path required flag to one. Setting of the data path required flag indicates whether a NAN Data Path (NDP) setup is required to support unicast data path. The NDP is a data connection established between a pair of NAN devices for a service instance. The inner data engine (115) performs operation of setting up, maintaining, and tearing down of the NDPs. In order to facilitate the NDP setup, the first NAN device (100*a*) transmits an inner cluster Service Discovery Frame (SDF) to the NAN devices (100*b*-100*j*) in the cluster (300), where the inner cluster SDF contains the publish message including a device capability attribute. A NAN device may also include the Device Capability attribute in any other NAN management frames. When the NAN devices (100*b*-100*j*) in the cluster (300) receives a NAN management frame with the inner cluster attribute from a peer NAN device of the same inner cluster, it shall apply the information in the received attributes immediately.

Although FIG. 2B shows the hardware components of the inner cluster controller (110), it is to be understood that other embodiments are not limited thereon. In other embodiments, the inner cluster controller (110) may include less or more components. Further, the labels or names of the components are used only for illustrative purpose and do not limit the scope of the invention. One or more components can be combined together to perform same or substantially similar function for joining or creating the inner cluster (200*a*).

Figure 3A:
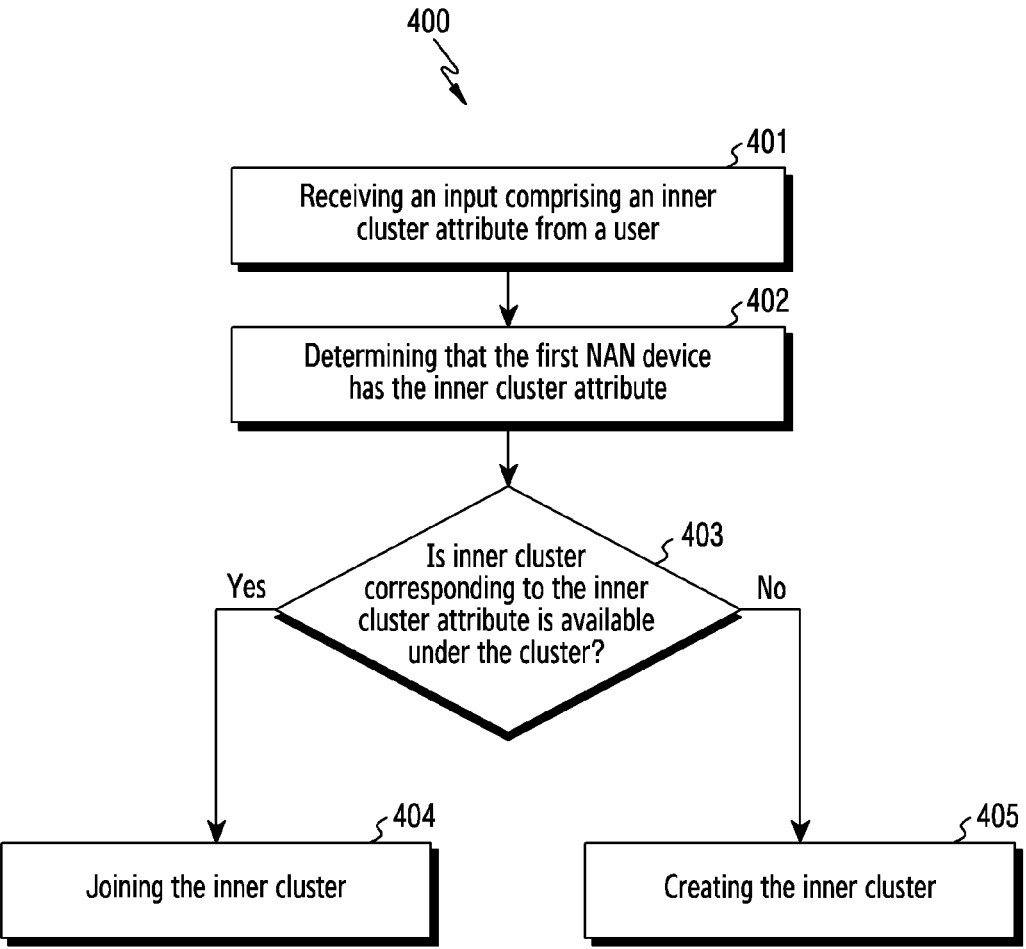
FIG. 3A is a flow diagram illustrating a method for managing the NAN devices in the cluster using a first NAN device, according to an example embodiment.

FIG. 3A is a flow diagram 400 illustrating a method for managing the NAN devices (100*a*-100*j*) in the cluster (300) using the first NAN device (100*a*), according to an embodiment as disclosed herein. The flow diagram 400 is explained using steps 401-405.

At step 401, the method may include receiving the input comprising the inner cluster attribute from the user. In an embodiment, the method allows the filter engine (111) to receive the input comprising the inner cluster attribute from the user.

At step 402, the method may include determining that the first NAN device (100*a*) has the inner cluster attribute. In an embodiment, the method allows the filter engine (111) to determine that the first NAN device (100*a*) has the inner cluster attribute.

At step 403, the method may include determining whether the inner cluster (200*a*) corresponding to the inner cluster attribute is available under the cluster (300). In an embodiment, the method allows the inner discovery engine (112) to determine whether the inner cluster (200*a*) corresponding to the inner cluster attribute is available under the cluster (300).

At step 404, the method may include joining the inner cluster (200*a*), in response to determining that the inner cluster (200*a*) corresponding to the inner cluster attribute is available under the cluster (300). In an embodiment, the method allows the inner data engine (115) to join the inner cluster (200*a*), in response to determining that the inner cluster (200*a*) corresponding to the inner cluster attribute is available under the cluster (300).

At step 405, the method may include creating the inner cluster (200*a*), in response to determining that the inner cluster (200*a*) corresponding to the inner cluster attribute is not available under the cluster (300). In an embodiment, the method allows the inner data engine (115) to create the inner cluster (200*a*), in response to determining that the inner cluster (200*a*) corresponding to the inner cluster attribute is not available under the cluster (300).

FIG. 3B is a flow diagram 405 illustrating a method for creating the inner cluster (200*a*) using the first NAN device (100*a*), according to an embodiment. The flow diagram 405 is explained using steps 405A-405G.

At step 405A, the method may include identifying the second NAN devices (100*b*-100*c*) having the inner cluster attribute in the cluster (300) of the NAN devices (100*a*-100*j*). In an embodiment, the method allows the inner discovery engine (112) to identify the second NAN devices (100*b*-100*c*) having the inner cluster attribute in the cluster (300) of the NAN devices (100*a*-100*j*).

At step 405B, the method may include determining the level of security needed for the inner cluster (200*a*). In an embodiment, the method allows the inner discovery engine (112) to determine the level of security needed for the inner cluster (200*a*).

At step 405C, the method may include selecting the wireless channel in the plurality of wireless channels with the least data traffic congestion and unused by the cluster (300). In an embodiment, the method allows the channel selector (113) to select the wireless channel in the plurality of wireless channels with the least data traffic congestion and unused by the cluster (300).

At step 405D, the method may include configuring the security to the wireless channel based on the level of security. In an embodiment, the method allows the channel selector (113) to configure the security to the wireless channel based on the level of security.

At step 405E, the method may include dynamically selecting the time window based on the service indicated in the inner cluster attribute. In an embodiment, the method allows the synchronization engine (114) to dynamically select the time window based on the service indicated in the inner cluster attribute.

At step 405F, the method may include configuring the second NAN devices (100*b*-100*c*) having the inner cluster attribute and the first NAN device (100*a*) with the selected wireless channel for the data communication.

In an embodiment, the method allows the inner data engine (115) to configure the second NAN devices (100*b*-100*c*) having the inner cluster attribute and the first NAN device (100*a*) with the selected wireless channel for the data communication.

At step 405G, the method may include configuring the second NAN devices (100*b*-100*c*) having the inner cluster attribute and the first NAN device (100*a*) for synchronizing at the selected time window. In an embodiment, the method allows the inner data engine (115) to configure the second NAN devices (100*b*-100*c*) having the inner cluster attribute and the first NAN device (100*a*) for synchronizing at the selected time window.

The various actions, acts, blocks, steps, or the like in the flow diagrams 400 and 405 may be performed in the order presented, in a different order or simultaneously. Further, in some embodiments, some of the actions, acts, blocks, steps, or the like may be omitted, added, modified, skipped, or the like without departing from the scope of the invention.

Figure 4A:
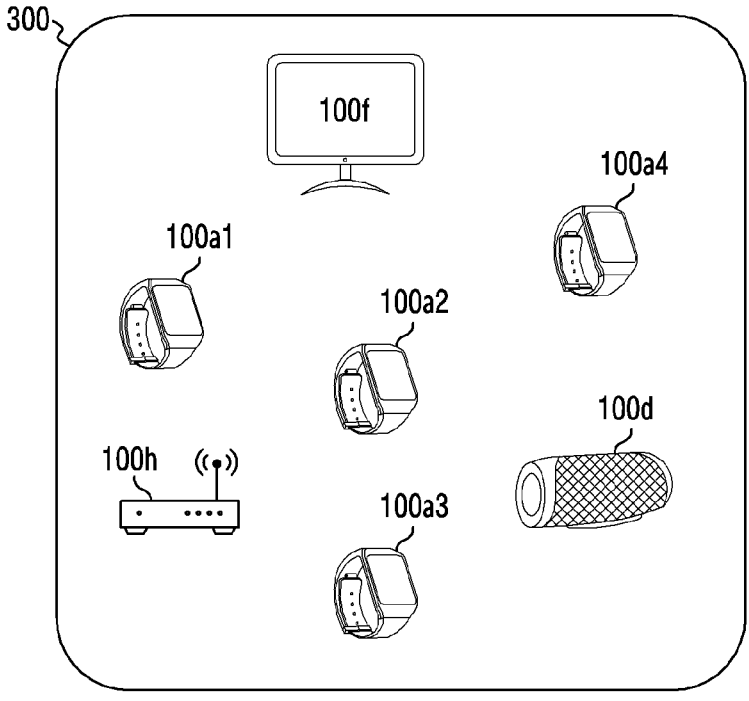
FIGS. 4A-4B illustrate an example scenario of clustering the NAN devices according to an existing method and the proposed method, according to an example embodiment.
Figure 4B:
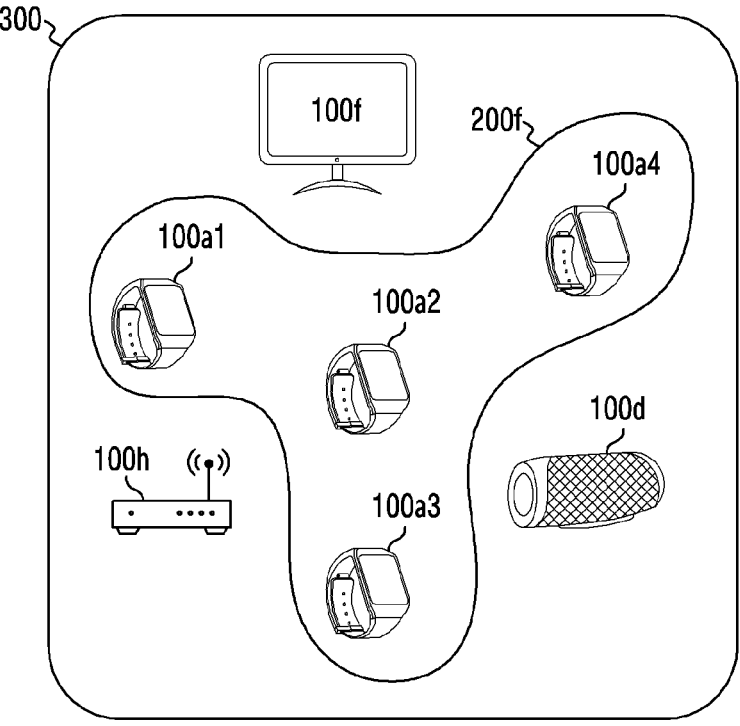

FIGS. 4A-4B illustrate an example scenario of clustering NAN devices according to an existing method and the proposed method, according to an embodiment as disclosed herein. Consider, that NAN devices include smart watches (100*a*1-100*a*4), a wireless speaker (100*d*), a smart Television (TV) (100*f*), and a Wi-Fi router (100*h*) are present in a home and near to each other. The NAN devices (100*a*1-100*a*4, 100*d*, 100*f*, 100*h*) form the cluster (300) using the existing method based on the location where they are present, as shown in the FIG. 4A. Any nearby NAN device can join the cluster (300).

The smart watches (100*a*1-100*a*4) are the wearable devices. Therefore, the inner cluster attribute of the smart watches (100*a*1-100*a*4) is stored as the wearable device. The wireless speaker (100*d*) is used to play music. Therefore, the inner cluster attribute of the wireless speaker (100*d*) is stored as the music. The smart TV (100*f*) can be used to play games. Therefore, the inner cluster attribute of the smart TV (100*f*) is stored as gaming. The Wi-Fi router (100*h*) does not contain the inner cluster attributes music or wearable device or gaming.

As shown in the FIG. 4B, while clustering the NAN devices (100*a*1-100*a*4, 100*d*, 100*f*, 100*h*) according to the proposed method, the smart watches (100*a*1-100*a*4) with the inner cluster attribute of wearable device, groups to form the inner cluster (200*f*). The inner cluster (200*f*) can be used to do tasks specific for smart watches (100*a*1-100*a*4). The NAN devices (100*d*, 100*f*, 100*h*) which do not have a common internal cluster attribute will join together to form the cluster (300) using the existing method.

The NAN devices (100*a*1-100*a*4) in the inner cluster (2001) are allowed to access information and services from the NAN devices (100*h*, 100*f*, 100*d*) in the cluster (300), whereas the NAN devices (100*h*, 100*f*, 100*d*) in the cluster (300) are not allowed to access information and services from the NAN devices (100*a*1-100*a*4) in the inner cluster (200*f*). The NAN devices (100*a*1-100*a*4) in the inner cluster (200*f*) can access information and services from each other.

Figure 4C:
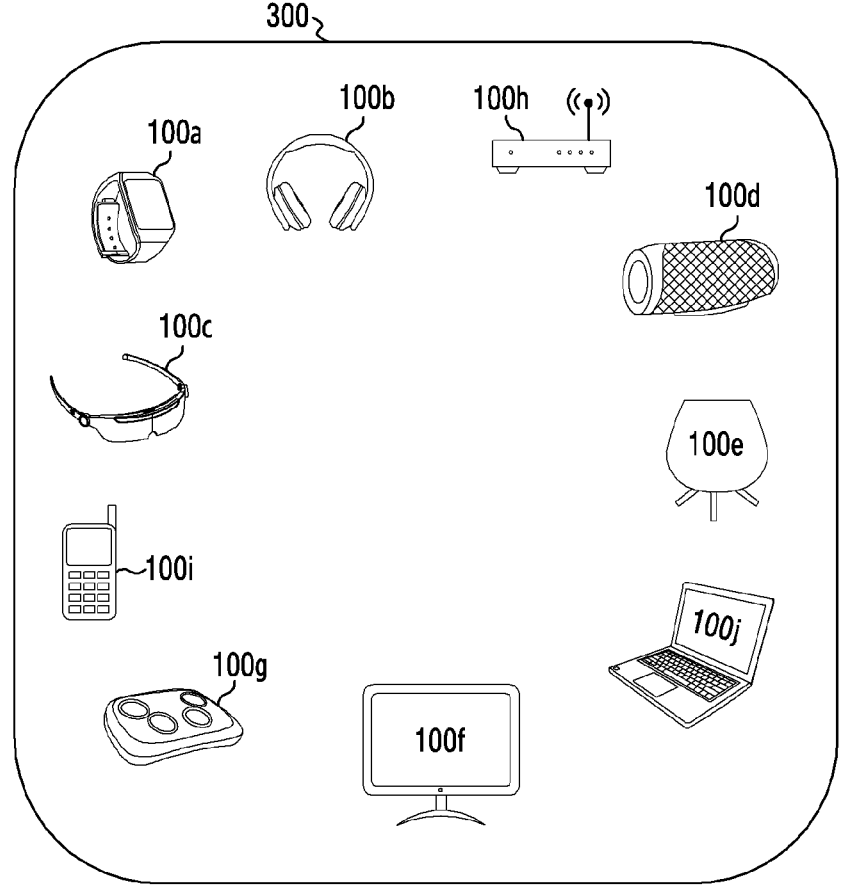
FIGS. 4C-4D illustrate another example scenario of clustering the NAN devices according to the existing method and the proposed method, according to an example embodiment.
Figure 4D:
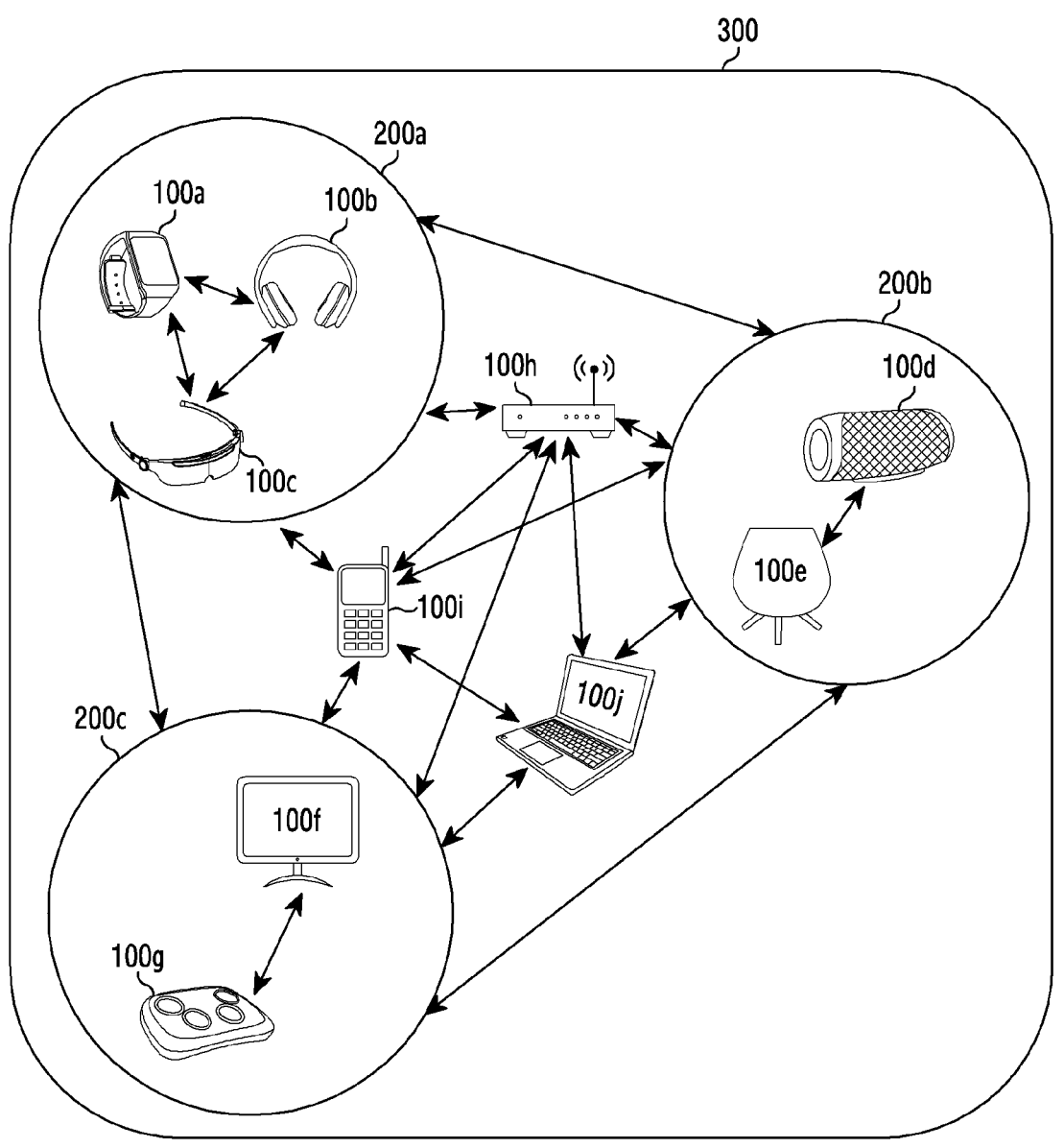

FIGS. 4C-4D illustrate another example scenario of clustering NAN devices according to the existing method and the proposed method, according to an embodiment as disclosed herein. Consider, that NAN devices (100*a*-100*j*) including a smart watch (100*a*), a headphone (100*b*), a smart goggle (100*c*), a wireless speaker (100*d*), a smart speaker (100*e*), a smart Television (TV) (100*f*), a game controller (100*g*), a Wi-Fi router (100*h*), a smartphone (100*i*), and a laptop (100*j*) are present in the home and near to each other. The NAN devices (100*a*-100*j*) form the cluster (300) using the existing method as shown in the FIG. 4C. The smart watch (100*a*), the headphone (100*b*), and the smart goggle/glasses (100*c*) are the wearable devices.

Therefore, the inner cluster attribute of the smart watch (100*a*), the headphone (100*b*), and the smart goggle (100*c*) are stored as the wearable device. The wireless speaker (100*d*), and the smart speaker (100*e*) are used to play music. Therefore, the inner cluster attribute of the wireless speaker (100*d*), and the smart speaker (100*e*) are stored as the music. The smart TV (100*f*), and the game controller (100*g*) can be used to play games. Therefore, the inner cluster attribute of the smart TV (100*f*) and the game controller (100*g*) are stored as gaming. The Wi-Fi router (100*h*), the smartphone (100*i*), and the laptop (100*j*) do not contain the inner cluster attributes music or wearable device or gaming.

As shown in the FIG. 4D, while clustering the NAN devices (100*a*-100*j*) according to the proposed method, the smart watch (100*a*), the headphone (100*b*), and the smart goggle/glasses (100*c*), with the inner cluster attribute of wearable device, groups to form the inner cluster (200*a*). Further, the wireless speaker (100*d*), and the smart speaker (100e) with the inner cluster attribute of music, group to form the inner cluster (200b). Further, the smart TV (100f) and the game controller (100g) with the inner cluster attribute of gaming groups, to form the inner cluster (200c). The Wi-Fi router (100h), the smartphone (100i), and the laptop (100j) stay within in the cluster (300) without joining to the inner clusters (200a-200c) due to not having the inner cluster attribute wearable device or music or gaming. In case the Wi-Fi router (100h), the smartphone (100i), and the laptop (100j) have a common inner cluster attribute, then the Wi-Fi router (100h), the smartphone (100i), and the laptop (100j) may group together to form another inner cluster under the cluster (300).

The NAN devices (100a-100b) in the inner cluster (200a) are allowed to access information and services from the NAN devices (100h-100j) in the cluster (300), whereas the NAN devices (100h-100j) in the cluster (300) are not allowed to access information and services from the NAN devices (100a-100b) in the inner cluster (200a). The NAN devices (100a-100b) in the inner cluster (200a) can access information and services from each other.

Similarly, the NAN devices (100e-100d) in the inner cluster (200b) are allowed to access information and services from the NAN devices (100h-100j) in the cluster (300), whereas the NAN devices (100h-100j) in the cluster (300) are not allowed to access information and services from the NAN devices (100e-100d) in the inner cluster (200b). The NAN devices (100e-100d) in the inner cluster (200b) can access information and services from each other.

Similarly, the NAN devices (100f-100g) in the inner cluster (200c) are allowed to access information and services from the NAN devices (100h-100j) in the cluster (300), whereas the NAN devices (100h-100j) in the cluster (300) are not allowed to access information and services from the NAN devices (100f-100g) in the inner cluster (200c). The NAN devices (100f-100g) in the inner cluster (200c) can access information and services from each other.

In certain example instances, the smart watch (100a) and smartphone (100i) may be entering to geographical/signal limits of the cluster (300) for first time, then the smartphone (100i) joins to the cluster (300), whereas the smart watch (100a) joins to the inner cluster (200a) due to same inner cluster attribute.

Figure 5:
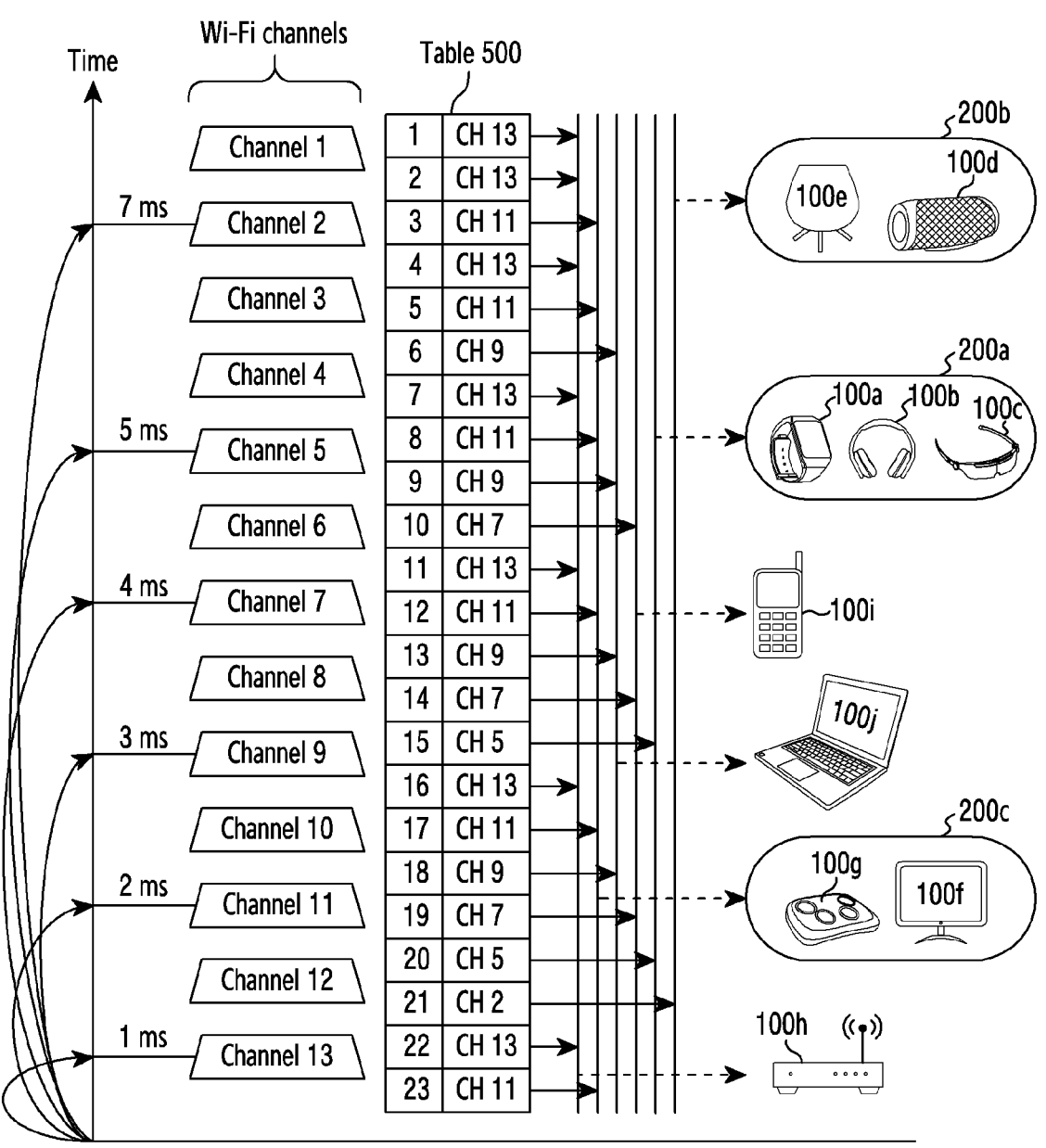
FIG. 5 is a schematic diagram illustrating an example scenario of assigning Wi-Fi channels to NAN devices, according to an example embodiment.

FIG. 5 is a schematic diagram illustrating an example scenario of assigning the Wi-Fi channels to the NAN devices (100a-100j), according to an embodiment as disclosed herein. Referring to the FIG. 4D, the cluster (300) of the NAN devices (100a-100j) includes the smart watch (100a), the headphone (100b), the smart goggle (100c), the wireless speaker (100d), the smart speaker (100e), the smart TV (1001), the game controller (100g), the Wi-Fi router (100h), the smartphone (100i), and the laptop (100j).

Consider, the cluster controller (140) divides the 2.4 GHz frequency band of Wi-Fi into 13 channels (i.e. wireless channels) and configures each channel with each NAN device (100a-100g), where the channels with channel number 13, 9, and 7 are the channels configured at the Wi-Fi router (100h), the laptop (100j), and the smartphone (100i) respectively Channels (CH) 2, 5 and 11 may be unused by the cluster (300). The cluster controller 140 configures different time window to each NAN device (100a-100g), where 1 millisecond (ms), 3 ms, and 4 ms are the time window configured at the Wi-Fi router (100h), the laptop (100j), and the smartphone (100i) respectively. Time windows 2 ms, 5 ms and 7 ms may be unused by the cluster (300).

In response to forming the inner clusters (e.g., 200a-200c), at least one of the NAN device in each inner cluster (200a-200c) selects the wireless channel and the time window for configuring the selected wireless channel and the selected time window with the inner cluster (200a-200c). For example, the smart watch (100a) detects that channel 5 is unused by the cluster (300) and chooses the channel 5 for the data communication. Further, the smart watch (100a) detects that 5 ms time window is unused by the cluster (300). Further, the smart watch (100a) dynamically selects 5 ms time window as a best time window for synchronization of the inner cluster (200a) based on the inner cluster attribute of the inner cluster (200a). Further, the smart watch (100a) configures the channel 5 and the 5 ms time window with the inner cluster (200a).

In another example, the smart speaker (100e) detects that channel 2 is unused by the cluster (300) and chooses the channel 2 for the data communication. Further, the smart speaker (100e) detects that 7 ms time window is unused by the cluster (300). Further, the smart speaker (100e) dynamically selects 7 ms time window as the best time window for synchronization of the inner cluster (200b) based on the inner cluster attribute of the inner cluster (200b). Further, the smart speaker (100e) configures the channel 2 and the 7 ms time window with the inner cluster (200b).

In another example, the game controller (100g) detects that channel 11 is unused by the cluster (300) and chooses the channel 11 for the data communication. Further, the game controller (100g) detects that 2 ms time window is unused by the cluster (300). Further, the game controller (100g) dynamically selects 2 ms time window as the best time window for synchronization of the inner cluster (200c) based on the inner cluster attribute of the inner cluster (200c). Further, the game controller (100g) configures the channel 11 and the 2 ms time window with the inner cluster (200c). Table 500 includes a WiFi channel list on which communication are being made. The 802.11 standard provides several distinct radio frequency ranges for use in Wi-Fi communications: 900 MHz, 2.4 GHz, 3.6 GHz, 4.9 GHz, 5 GHz, 5.9 GHz, 6 GHz and 60 GHz bands.

Figure 6:
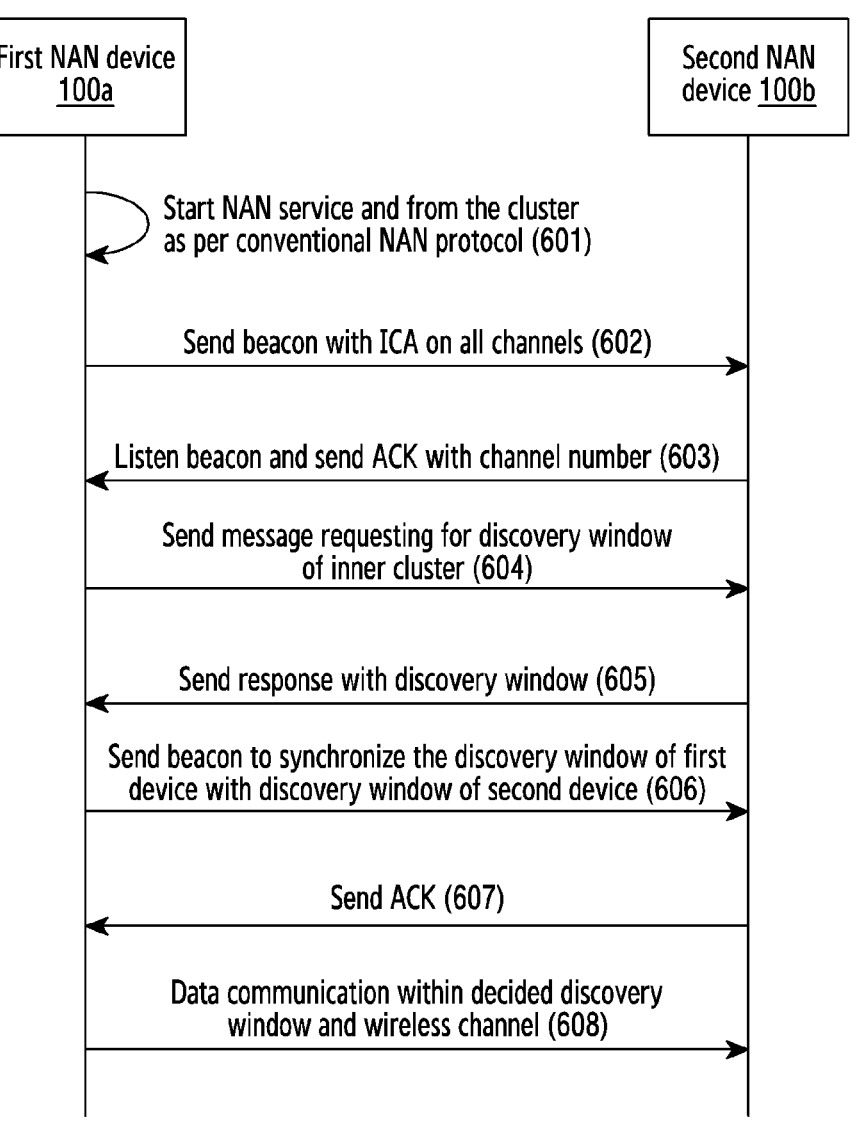
FIG. 6 is a sequential diagram illustrating signaling of a first NAN device with a second NAN device for joining to the inner cluster, according to an example embodiment.

FIG. 6 is a sequential diagram illustrating signaling of the first NAN device (100a) with the second NAN device (100b) for joining to the inner cluster (200a), according to an embodiment as disclosed herein. Consider, the second device (100b) is already present in the inner cluster (200a) with the inner cluster attribute under the cluster (300), and the first NAN device (100a) receives the input including the inner cluster attribute from the user to starts the NAN and join to the cluster (300).

At 601, the cluster controller (140) of the first NAN device (100a) starts the NAN and joins the cluster (300) as per existing protocol for NAN.

At 602, in order to join to the inner cluster (200a), the filter engine (111) of the first NAN device (100a) sends the beacon with the inner cluster attribute to all the wireless channels of the cluster (300).

At 603, the filter engine (111) of the second NAN device (100b) listens the beacon and detects that the inner cluster attribute in the beacon matches with the inner cluster attribute of the inner cluster (200a). Further, the channel selector (113) of the second NAN device (100b) sends an Acknowledgement (ACK) including the channel number of the wireless channel of the inner cluster (200a) to the first NAN device (100a) based on the configured security to the wireless channel.

At 604, the inner discovery engine (112) of the first NAN device (100*a*) sends a message to the second NAN device (100*b*) requesting for the discovery window of the inner cluster (200*a*).

At 605, the synchronization engine (114) of the second NAN device (100*b*) sends a response including the discovery window of the inner cluster (200*a*) to the first NAN device (100*a*).

At 606, the synchronization engine (114) of the first NAN device (e.g., 100*a*) sends a beacon to synchronize the discovery window of the second NAN device (e.g., 100*b*) with the discovery window of the inner cluster (e.g., 200*a*).

At 607, the synchronization engine (114) of the second NAN device (100*b*) sends an ACK to the first NAN device (100*a*) in response to successful synchronization. At 608, in response to receiving the ACK, the inner data engine (115) of the first NAN device (100*a*) performs the data communication with the second NAN device (100*b*) within the decided discovery window and the wireless channel.

Figure 7A:
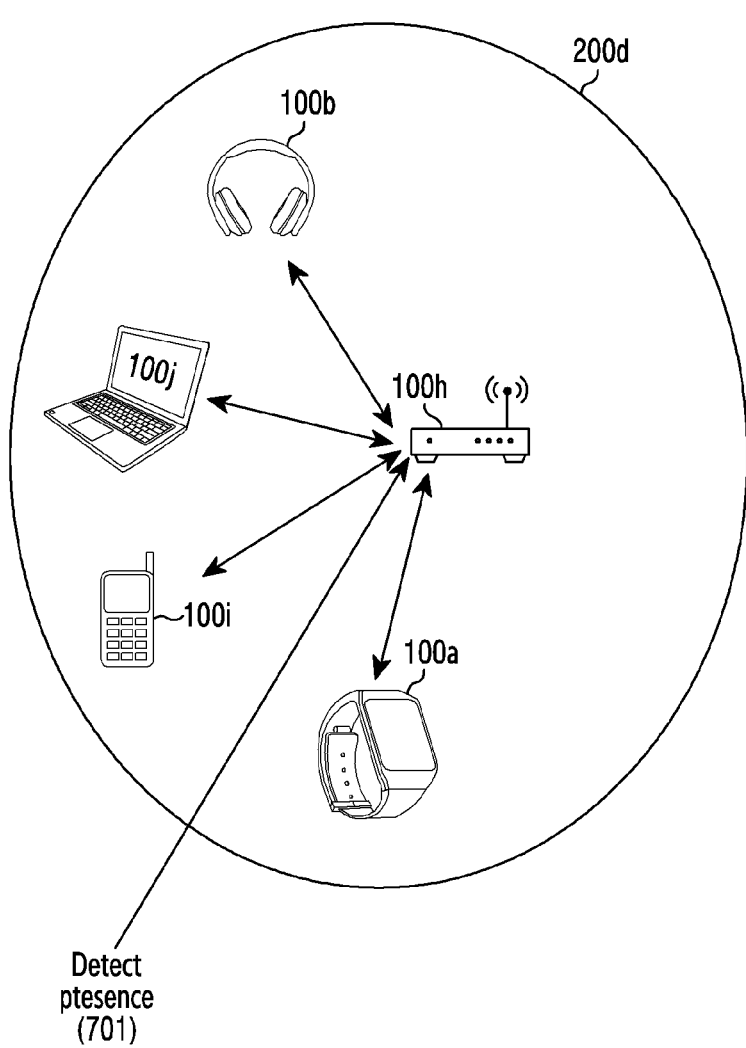
FIGS. 7A-7B illustrate an example scenario of tracking entry and exit of an authorized NAN device using the inner cluster, according to an example embodiment.
Figure 7B:
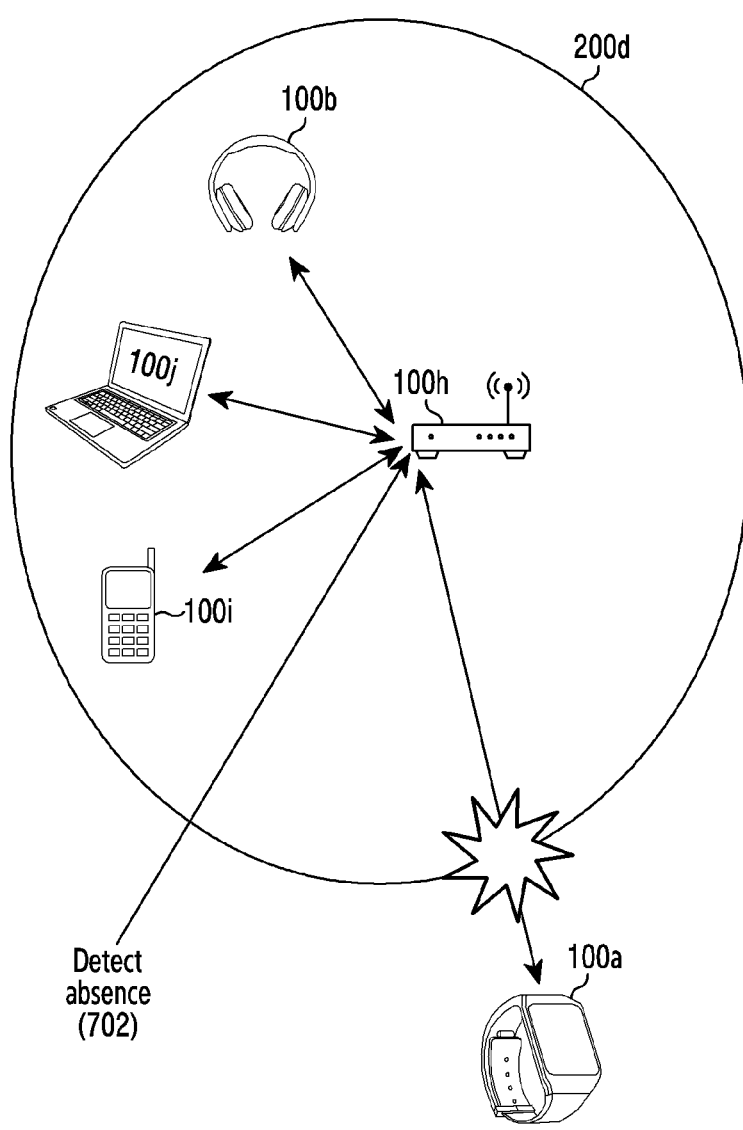

FIGS. 7A-7B illustrate an example scenario of tracking attendance of an employee in a company using the proposed method, according to an embodiment as disclosed herein. In the example scenario, the NAN devices used by each employee in the company are the headphone (100*b*), the laptop (100*j*), the smartphone (100*i*), and the smartwatch (100*a*). The router (100*h*) is located inside a company room. The NAN devices (100*a*, 100*b*, 100*h*, 100*i*, 100*j*) have same inner cluster attribute. Consider, that the NAN devices (100*a*, 100*b*, 100*i*, 100*j*) are part of the cluster (300). In order to track entry and exit of the employee in the company, the router (100*h*) creates the inner cluster (200*d*) using the NAN devices (100*a*, 100*b*, 100*i*, 100*j*) having the same inner cluster attribute under the cluster (300), as shown in the FIG. 7A.

Whenever the employee enters along with their NAN device (100*a*, 100*b*, 100*i*, 100*j*) and stays within a geographical/signal limit of the inner cluster (200*d*), then the router (100*h*) detects presence (701) of the NAN device (100*a*, 100*b*, 100*i*, 100*j*) in the inner cluster (200*d*) using the proposed method and records a login and an attendance of the employee. Whenever the employee leaves from the geographical/signal limit of the inner cluster (200*d*) along with the NAN device (100*a*) as shown in the FIG. 7B, the router (100*h*) detects absence (702) of the NAN device (100*a*) in the inner cluster (200*d*) and records a logout of the employee from the company. The beacons sent at regular intervals by NAN devices (100*a*, 100*b*, 100*h*, 100*i*, 100*j*) are used for tracking the attendance of the employee in the company, which is less complex and a more energy efficient method.

Figure 8A:
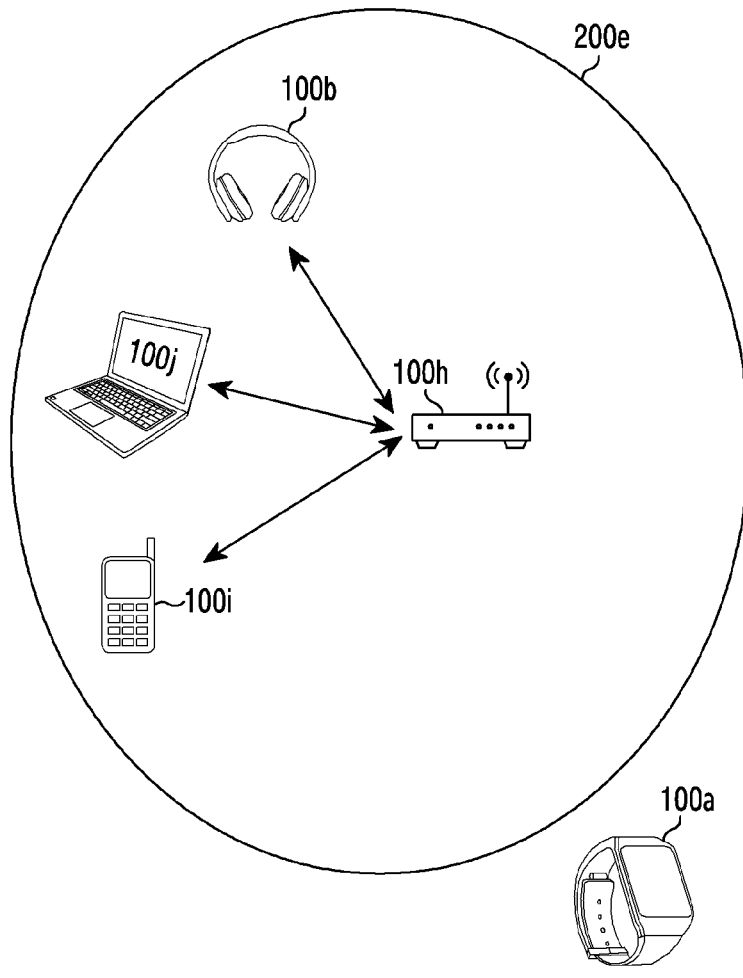
FIGS. 8A-8B illustrate an example scenario of detecting an intrusion of an unauthorized NAN device using the inner cluster, according to an example embodiment.
Figure 8B:
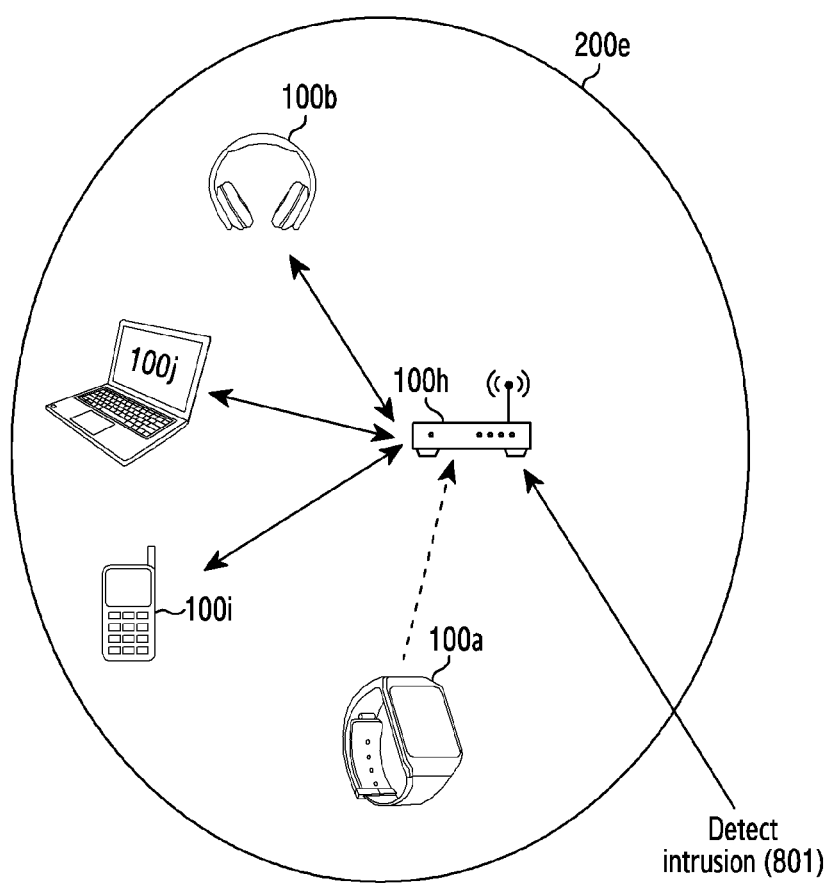

FIGS. 8A-8B illustrate an example scenario of detecting an intrusion using the proposed method, according to an embodiment as disclosed herein. In the example scenario, the NAN devices used by each candidate in an exam hall are the headphone (100*b*), the laptop (100*j*), and the smartphone (100*i*). The router (100*h*) is located inside the exam hall. The NAN devices (e.g., 100*b*, 100*h*, 100*i*, 100*j*) have same inner cluster attribute. Consider, that the NAN devices (100*b*, 100*i*, 100*j*) are part of the cluster (300). The router (100*h*) creates the inner cluster (200*e*) using the NAN devices (100*b*, 100*i*, 100*j*) with the same inner cluster attribute under the cluster (300), as shown in the FIG. 8A. The candidates are present inside the exam hall along with their NAN devices (100*b*, 100*i*, 100*j*), where the NAN devices (100*b*, 100*i*, 100*j*) are within the geographical/signal limit of the inner cluster (200*e*). Therefore, the router (100*h*) detects the presence of the NAN devices (100*b*, 100*i*, 100*j*) in the inner cluster (200*e*) using the proposed method and records the NAN devices (100*b*, 100*i*, 100*j*) as authorized devices.

Consider, an intruder enters in to the exam hall along with his NAN device (100*a*) as shown in the FIG. 8B, where the inner cluster attribute of the NAN device (100*a*) is not same as the inner cluster attribute of the inner cluster (200*e*). In response to detecting the inner cluster (200*e*), the NAN device (100*a*) tries to join the inner cluster (200*e*). The router (100*h*) detects that the inner cluster attribute of the NAN device (100*a*) is not same as the inner cluster attribute of the inner cluster (200*e*) and considers the NAN device (100*a* as a unauthorized device, in response to receiving a request from the NAN device (100*a*) to join the inner cluster (200*e*). Further, the router (100*h*) detects the intrusion (801) in the exam hall and alerts an proctor in the exam hall regarding the intrusion.

Additionally, whenever the candidate leaves from the geographical/signal limit of the inner cluster (200*e*) along with the NAN device (100*b*, 100*i*, 100*j*), the router (100*h*) detects absence of the NAN device (100*b*, 100*i*, 100*j*) in the inner cluster (200*d*) and records that the candidate left the exam hall. Further, the router (100*h*) alerts the proctor regarding the exit of the candidate.

Figure 9:
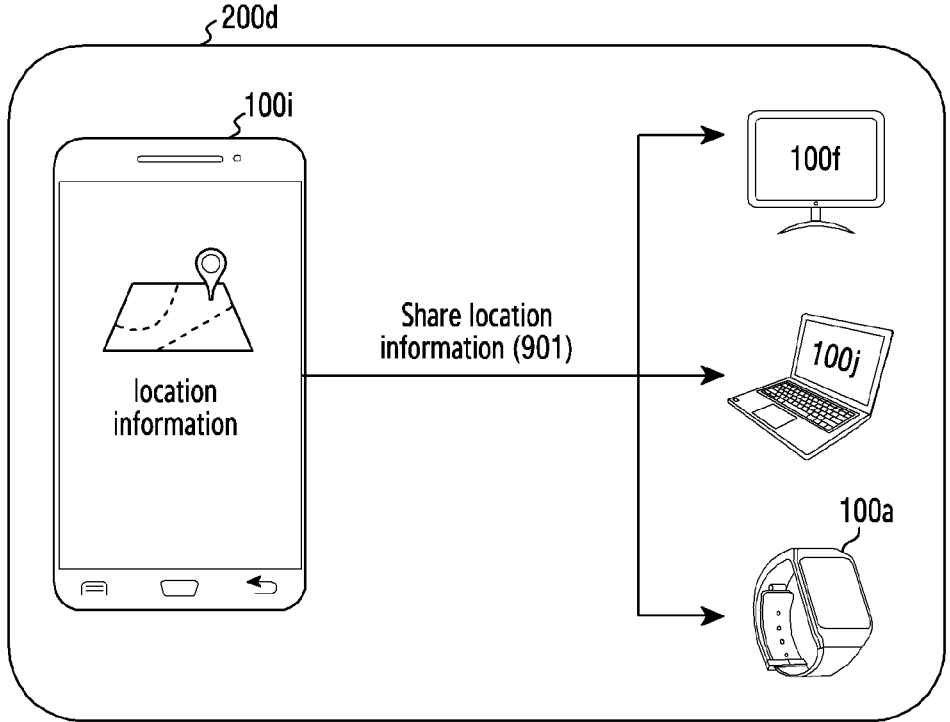
FIG. 9 illustrates an example scenario of sharing a location information among NAN devices in the inner cluster, according to an example embodiment.

FIG. 9 illustrates an example scenario of sharing a location information among the NAN devices (e.g., 100*a*, 100*j*, 100*f*) in the inner cluster, according to an embodiment. Consider, the smart TV (100*f*), the laptop (100*j*), the smartphone (100*i*), and the smartwatch (100*a*) are the NAN devices in the inner cluster. The smartphone (100*i*) contains a position sensor to determine a current geographical location of the smartphone (100*i*), where the NAN devices (100*f*, 100*j*, 100*a*) need not contain the position sensor. The proposed method allows the smartphone (100*i*) to share its service only to the NAN devices (100*f*, 100*j*, 100*a*) within the inner cluster (200*d*). Therefore, the NAN devices (100*f*, 100*j*, 100*a*) can access the service of the smartphone (100*i*) and obtain necessary information.

In the example scenario, the smartphone (100*i*) shares the location information (901) of the smartphone (100*i*) only to the NAN devices (100*f*, 100*j*, 100*a*) within the inner cluster (200*d*), where NAN devices outside the inner cluster (200*d*) are not allowed to receive the location information. Thus, the proposed method improves the security of the services provided by the NAN devices (100*i*, 100*f*, 100*j*, 100*a*). The NAN devices (100*f*, 100*j*, 100*a*) obtains the location information without adding the position sensor to its hardware architecture, which reduces a design complexity and manufacturing cost of the NAN devices.

Figure 10:
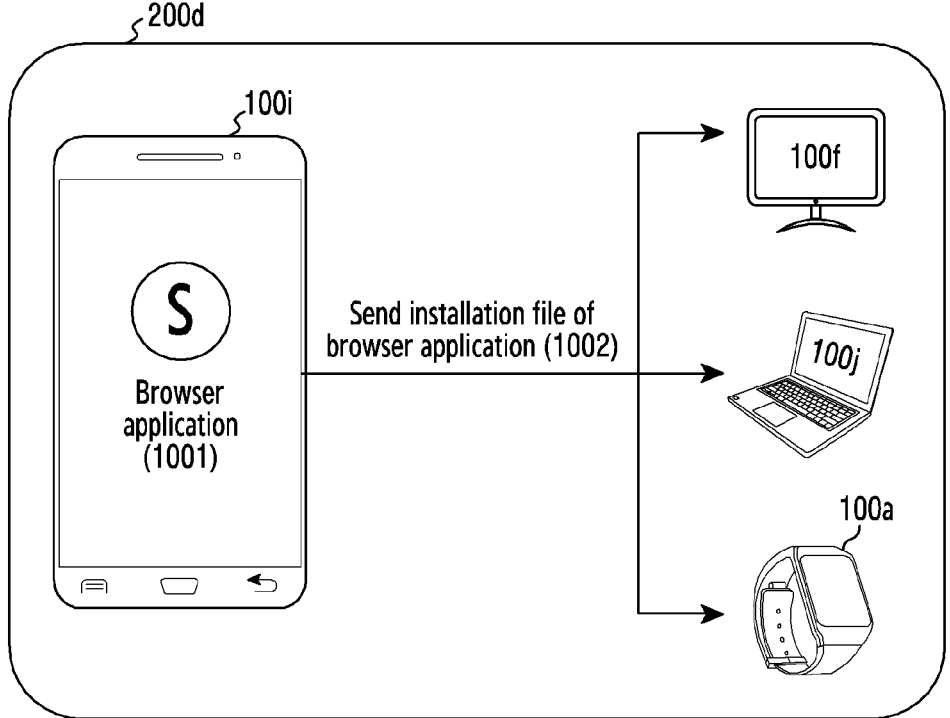
FIG. 10 illustrates an example scenario of sending an installation file of an application among the NAN devices in the inner cluster, according to an example embodiment.

FIG. 10 illustrates an example scenario of sending an installation file of an application among the NAN devices in the inner cluster, according to an embodiment as disclosed herein. Consider, the smart TV (1001), the laptop (100*j*), the smartphone (100*i*), and the smartwatch (100*a*) are the NAN devices in the inner cluster (200*d*). A browser application (1001) is already installed at the smartphone (100*i*), where the NAN devices (100*f*, 100*j*, 100*a*) does not contain the browser application. The proposed method allows the smartphone (100*i*) to share files in the smartphone (100*i*) only to the NAN devices (100*f*, 100*j*, 100*a*) within the inner cluster (200*d*).

Therefore, the NAN devices (100*f*, 100*j*, 100*a*) can receive the files from the smartphone (100*i*). In the example scenario, the smartphone (100*i*) sends an installation file of the browser application (1002) only to the NAN devices (100*f*, 100*j*, 100*a*) within the inner cluster (200*d*), where NAN devices outside the inner cluster (200*d*) are not allowed to receive the installation file. Thus, the proposed method improves the security of the files and information provided by the NAN devices (100*i*, 100*f*, 100*j*, 100*a*). The NAN devices (100*f*, 100*j*, 100*a*) receives the installation file without connecting to the external server through internet, which improves networking capabilities of the NAN devices (100*i*, 100*f*, 100*j*, 100*a*) and reduces internet data consumption.

Figure 11:
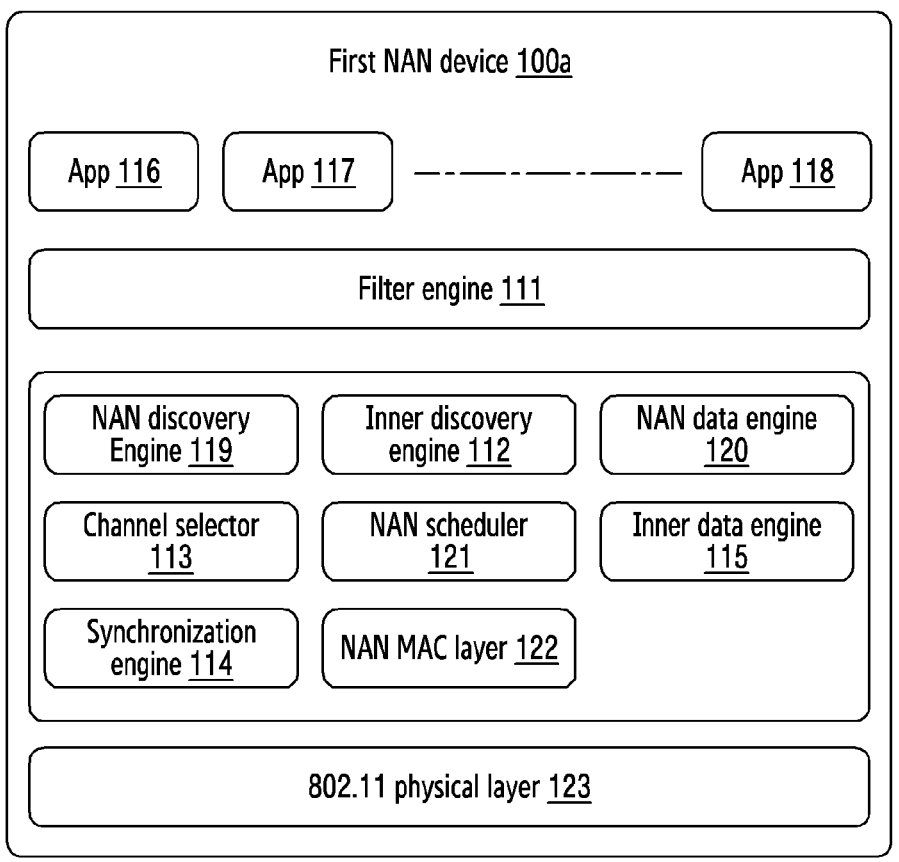
FIG. 11 is an architectural diagram of the first NAN device, according to an example embodiment.

FIG. 11 is an architectural diagram of the first NAN device (100*a*), according to an embodiment as disclosed herein. In another embodiment, the first NAN device (100*a*) may include the filter engine (111), the inner discovery engine (112), the channel selector (113), the synchronization engine (114), the inner data engine (115), applications (116-118), a NAN discovery engine (119), a NAN data engine (120), a NAN scheduler (121), a NAN MAC layer (122), and an 802.11 physical layer (123).

According to embodiments, a method performed by a first Neighborhood Awareness Networking (NAN) device of NAN devices in a cluster, the method comprising: receiving an input comprising an inner cluster attribute from a user, wherein the inner cluster attribute indicates a service for the user. The method comprises determining that the first NAN device has the inner cluster attribute. The method comprises determining whether an inner cluster corresponding to the inner cluster attribute is available under the cluster, wherein the inner cluster comprises a subset of the NAN devices with the inner cluster attribute. And, the method comprises performing at least one of: joining the inner cluster, in response to determining that the inner cluster corresponding to the inner cluster attribute is available under the cluster, and creating the inner cluster in response to determining that the inner cluster corresponding to the inner cluster attribute is not available under the cluster.

In one embodiment, the method further comprising identifying at least one second NAN device having the inner cluster attribute in the cluster of the NAN devices. The method comprises determining a level of security for the inner cluster. The method comprises selecting a wireless channel in a plurality of wireless channels with least data traffic congestion and unused by the cluster. The method comprises configuring a security to the wireless channel based on the level of security. The method comprises selecting a time window based on the service indicated in the inner cluster attribute, wherein the time window is unused by the cluster. The method comprises configuring at least one second NAN device having the inner cluster attribute and the first NAN device with the selected wireless channel for data communication. And the method comprises configuring the at least one second NAN device having the inner cluster attribute and the first NAN device for synchronizing at the selected time window.

In one embodiment, the method further comprising selecting a wireless channel in a plurality of wireless channels assigned to the inner cluster for data communication. And the method comprises selecting a time window assigned to the inner cluster for synchronizing at the selected time window.

In one embodiment, the method further comprising broadcasting the inner cluster attribute to at least one second NAN device in the cluster of the NAN devices through a plurality of wireless channels. The method comprises receiving a response from the at least one second NAN device, wherein the response indicates whether the inner cluster attribute is present at the at least one second NAN device. And the method comprises performing at least one of determining that the inner cluster corresponding to the inner cluster attribute is available under the cluster when the inner cluster attribute is present at the at least one second NAN device, and determining that the inner cluster corresponding to the inner cluster attribute is not available under the cluster when the inner cluster attribute is not present at the at least one second NAN device.

In one embodiment, wherein the NAN devices in the inner cluster are allowed to access information and services from the NAN devices in the cluster, and wherein the NAN devices in the cluster are not allowed to access information and services from the NAN devices in the inner cluster.

According to embodiments, a first Neighborhood Awareness Networking (NAN) device in a cluster of NAN devices for managing the NAN devices, the first NAN device comprising: a transceiver and at least one processor coupled to the transceiver. Wherein the at least one processor is configured to receive an input comprising an inner cluster attribute from a user, wherein the inner cluster attribute indicates a service for the user, determine that the first NAN device has the inner cluster attribute, determine whether an inner cluster corresponding to the inner cluster attribute is available under the cluster, wherein the inner cluster comprises a subset of the NAN devices with the inner cluster attribute; and perform at least one of: joining the inner cluster, in response to determining that the inner cluster corresponding to the inner cluster attribute is available under the cluster, and creating the inner cluster, in response to determining that the inner cluster corresponding to the inner cluster attribute is not available under the cluster.

In one embodiment, wherein the at least one processor is further configured to identify at least one second NAN device having the inner cluster attribute in the cluster of the NAN devices. Wherein the at least one processor is further configured to determine a level of security for the inner cluster. Wherein the at least one processor is further configured to select a wireless channel in a plurality of wireless channels with least data traffic congestion and unused by the cluster. Wherein the at least one processor is further configured to configure a security to the wireless channel based on the level of security. Wherein the at least one processor is further configured to select a time window based on the service indicated in the inner cluster attribute, wherein the time window is unused by the cluster. Wherein the at least one processor is further configured to configure at least one second NAN device having the inner cluster attribute and the first NAN device with the selected wireless channel for data communication. And wherein the at least one processor is further configured to configure the at least one second NAN device having the inner cluster attribute and the first NAN device for synchronizing at the selected time window.

In one embodiment, wherein the at least one processor is further configured to select a wireless channel in a plurality of wireless channels assigned to the inner cluster for data communication; and select a time window assigned to the inner cluster for synchronizing at the selected time window.

In one embodiment, wherein the at least one processor is further configured to broadcast the inner cluster attribute to at least one second NAN device in the cluster of the NAN devices through a plurality of wireless channels. The at least one processor is further configured to receive a response from the at least one second NAN device, wherein the response indicates whether the inner cluster attribute is present at the at least one second NAN device. And the at least one processor is further configured to perform at least one of: determining that the inner cluster corresponding to the inner cluster attribute is available under the cluster when the inner cluster attribute is present at the at least one second NAN device, and determining that the inner cluster corresponding to the inner cluster attribute is not available under the cluster when the inner cluster attribute is not present at the at least one second NAN device.

In one embodiment, wherein the NAN devices in the inner cluster are allowed to access information and services from the NAN devices in the cluster, and wherein the NAN devices in the cluster are not allowed to access information and services from the NAN devices in the inner cluster.

According to embodiments, a method performed by a first Proximity Awareness Networking (PAN) device of PAN devices in a cluster, the method comprising: receiving an input comprising an inner cluster attribute from a user, wherein the inner cluster attribute indicates a service for the user. The method comprises determining that the first PAN device has the inner cluster attribute. The method comprises determining whether an inner cluster corresponding to the inner cluster attribute is available under the cluster, wherein the inner cluster comprises a subset of the PAN devices with the inner cluster attribute. And, the method comprises performing at least one of: joining the inner cluster, in response to determining that the inner cluster corresponding to the inner cluster attribute is available under the cluster, and creating the inner cluster in response to determining that the inner cluster corresponding to the inner cluster attribute is not available under the cluster.

In one embodiment, the method further comprising identifying at least one second PAN device having the inner cluster attribute in the cluster of the PAN devices. The method comprises determining a level of security for the inner cluster. The method comprises selecting a wireless channel in a plurality of wireless channels with least data traffic congestion and unused by the cluster. The method comprises configuring a security to the wireless channel based on the level of security. The method comprises selecting a time window based on the service indicated in the inner cluster attribute, wherein the time window is unused by the cluster. The method comprises configuring at least one second PAN device having the inner cluster attribute and the first PAN device with the selected wireless channel for data communication. And the method comprises configuring the at least one second PAN device having the inner cluster attribute and the first PAN device for synchronizing at the selected time window.

In one embodiment, the method further comprising selecting a wireless channel in a plurality of wireless channels assigned to the inner cluster for data communication. And the method comprises selecting a time window assigned to the inner cluster for synchronizing at the selected time window.

In one embodiment, the method further comprising broadcasting the inner cluster attribute to at least one second PAN device in the cluster of the PAN devices through a plurality of wireless channels. The method comprises receiving a response from the at least one second PAN device, wherein the response indicates whether the inner cluster attribute is present at the at least one second PAN device. And the method comprises performing at least one of determining that the inner cluster corresponding to the inner cluster attribute is available under the cluster when the inner cluster attribute is present at the at least one second PAN device, and determining that the inner cluster corresponding to the inner cluster attribute is not available under the cluster when the inner cluster attribute is not present at the at least one second PAN device.

In one embodiment, wherein the PAN devices in the inner cluster are allowed to access information and services from the PAN devices in the cluster, and wherein the PAN devices in the cluster are not allowed to access information and services from the PAN devices in the inner cluster.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a first Neighborhood Awareness Networking (NAN) device of NAN devices in a cluster, the method comprising:

receiving an input comprising an inner cluster attribute from a user, wherein the inner cluster attribute indicates a service for the user;

determining that the first NAN device has the inner cluster attribute;

determining whether an inner cluster which corresponds to the inner cluster attribute and is available under the cluster exists, wherein the inner cluster comprises a subset of the NAN devices with the inner cluster attribute;

joining the first NAN device to the inner cluster, in response to determining that the inner cluster which corresponds to the inner cluster attribute and is available under the cluster exists; and creating the inner cluster including the first NAN device, in response to determining that the inner cluster which corresponds to the inner cluster attribute and is available under the cluster does not exist, wherein the first NAN device in the inner cluster is allowed to access information and services from a second NAN device which is included in the cluster and is not included in the inner cluster, wherein the second NAN device is not allowed to access information and services from the first NAN device in the inner cluster, wherein the inner cluster attribute indicates a type of device suitable to provide the service for the user or a type of device that is located in a geographical area suitable to provide the service for the user, and wherein creating the inner cluster comprises: identifying a third NAN device having the inner cluster attribute in the cluster of the NAN devices and setting a discovery window for discovering NAN devices in the inner cluster based on the service for the user indicated by the inner cluster attribute.

2. The method of claim 1, the method further comprising:

determining a level of security for the inner cluster;

selecting a wireless channel in a plurality of wireless channels with least data traffic congestion and unused by the cluster;

configuring a security to the wireless channel based on the level of security;

selecting a time window based on the service indicated in the inner cluster attribute, wherein the time window is unused by the cluster;

configuring the third NAN device having the inner cluster attribute and the first NAN device with the selected wireless channel for data communication; and configuring the third NAN device having the inner cluster attribute and the first NAN device for synchronizing at the selected time window.

3. The method of claim 1, the method further comprising:

selecting a wireless channel in a plurality of wireless channels assigned to the inner cluster for data communication; and selecting a time window assigned to the inner cluster for synchronizing at the selected time window.

4. The method of claim 1, the method further comprising:

broadcasting the inner cluster attribute to a fourth NAN device in the cluster of the NAN devices through a plurality of wireless channels;

receiving a response from the fourth NAN device, wherein the response indicates whether the fourth NAN device has the inner cluster attribute; and performing at least one of:

determining that the inner cluster corresponding to the inner cluster attribute is available under the cluster when the fourth NAN device has the inner cluster attribute, and determining that the inner cluster corresponding to the inner cluster attribute is not available under the cluster when the fourth NAN device does not have the inner cluster attribute.

5. A first Neighborhood Awareness Networking (NAN) device in a cluster of NAN devices for managing the NAN devices, the first NAN device comprising:

a transceiver;

at least one processor coupled to the transceiver;

wherein the at least one processor is configured to:

receive an input comprising an inner cluster attribute from a user, wherein the inner cluster attribute indicates a service for the user;

determine that the first NAN device has the inner cluster attribute;

determine whether an inner cluster which corresponds to the inner cluster attribute and is available under the cluster exists, wherein the inner cluster comprises a subset of the NAN devices with the inner cluster attribute;

join the first NAN device to the inner cluster, in response to determining that the inner cluster which corresponds to the inner cluster attribute and is available under the cluster exists; and create the inner cluster including the first NAN device, in response to determining that the inner cluster which corresponds to the inner cluster attribute and is available under the cluster does not exist, wherein the first NAN device in the inner cluster is allowed to access information and services from a second NAN device which is included in the cluster and is not included in the inner cluster, wherein the second NAN device is not allowed to access information and services from the first NAN device in the inner cluster, wherein the inner cluster attribute indicates a type of device suitable to provide the service for the user or a type of device that is located in a geographical area suitable to provide the service for the user, and wherein the at least one processor is further configured to:

identify a third NAN device having the inner cluster attribute in the cluster of the NAN devices and set a discovery window for discovering NAN devices in the inner cluster based on the service for the user indicated by the inner cluster attribute.

6. The first NAN device of claim 5, wherein the at least one processor is further configured to:

determine a level of security for the inner cluster;

select a wireless channel in a plurality of wireless channels with least data traffic congestion and unused by the cluster;

configure a security to the wireless channel based on the level of security;

select a time window based on the service indicated in the inner cluster attribute, wherein the time window is unused by the cluster;

configure the third NAN device having the inner cluster attribute and the first NAN device with the selected wireless channel for data communication; and configure the third NAN device having the inner cluster attribute and the first NAN device for synchronizing at the selected time window.

7. The first NAN device of claim 5, wherein the at least one processor is further configured to:

select a wireless channel in a plurality of wireless channels assigned to the inner cluster for data communication; and select a time window assigned to the inner cluster for synchronizing at the selected time window.

8. The first NAN device of claim 5, wherein the at least one processor is further configured to:

broadcast the inner cluster attribute to a fourth NAN device in the cluster of the NAN devices through a plurality of wireless channels;

receive a response from the fourth NAN device, wherein the response indicates whether the fourth NAN device has the inner cluster attribute; and perform at least one of:

determining that the inner cluster corresponding to the inner cluster attribute is available under the cluster when the fourth NAN device has the inner cluster attribute, and determining that the inner cluster corresponding to the inner cluster attribute is not available under the cluster when the fourth NAN device does not have the inner cluster attribute.

9. A method performed by a first Proximity Awareness Networking (PAN) device of PAN devices in a cluster, the method comprising:

receiving an input comprising an inner cluster attribute from a user, wherein the inner cluster attribute indicates a service for the user;

determining that the first PAN device has the inner cluster attribute;

determining whether an inner cluster which corresponds to the inner cluster attribute and is available under the cluster exists, wherein the inner cluster comprises a subset of the PAN devices with the inner cluster attribute;

joining the first PAN device to the inner cluster, in response to determining that the inner cluster which corresponds to the inner cluster attribute and is available under the cluster exists; and creating the inner cluster including the first PAN device, in response to determining that the inner cluster which corresponds to the inner cluster attribute and is available under the cluster does not exist, wherein the first PAN device in the inner cluster is allowed to access information and services from a second PAN device which is included in the cluster and is not included in the inner cluster, wherein the second PAN device is not allowed to access information and services from the first PAN device in the inner cluster, wherein the inner cluster attribute indicates a type of device suitable to provide the service for the user or a type of device that is located in a geographical area suitable to provide the service for the user, and wherein creating the inner cluster comprises: identifying a third PAN device having the inner cluster attribute in the cluster of the PAN devices and setting a discovery window for discovering PAN devices in the inner cluster based on the service for the user indicated by the inner cluster attribute.

10. The method of claim 9, the method further comprising:

determining a level of security for the inner cluster;

selecting a wireless channel in a plurality of wireless channels with least data traffic congestion and unused by the cluster;

configuring a security to the wireless channel based on the level of security;

selecting a time window based on the service indicated in the inner cluster attribute, wherein the time window is unused by the cluster;

configuring the third PAN devices having the inner cluster attribute and the first PAN device with the selected wireless channel for data communication; and configuring the third PAN devices having the inner cluster attribute and the first PAN device for synchronizing at the selected time window.

11. The method of claim 9, the method further comprising:

selecting a wireless channel in a plurality of wireless channels assigned to the inner cluster for data communication; and selecting a time window assigned to the inner cluster for synchronizing at the selected time window.

12. The method of claim 9, the method further comprising:

broadcasting the inner cluster attribute to a fourth PAN device in the cluster of the PAN devices through a plurality of wireless channels;

receiving a response from the fourth PAN device, wherein the response indicates whether the fourth PAN device has the inner cluster attribute; and performing at least one of:

determining that the inner cluster corresponding to the inner cluster attribute is available under the cluster when the fourth PAN device has the inner cluster attribute, and determining that the inner cluster corresponding to the inner cluster attribute is not available under the cluster when the fourth PAN device does not have the inner cluster attribute.

13. A first Proximity Awareness Networking (PAN) device in a cluster of PAN devices for managing the PAN devices, the first PAN device comprising:

a transceiver;

at least one processor coupled to the transceiver;

wherein the at least one processor is configured to:

receive an input comprising an inner cluster attribute from a user, wherein the inner cluster attribute indicates a service for the user;

determine that the first PAN device has the inner cluster attribute;

determine whether an inner cluster which corresponds to the inner cluster attribute and is available under the cluster exists, wherein the inner cluster comprises a subset of the PAN devices with the inner cluster attribute;

join the first PAN device to the inner cluster, in response to determining that the inner cluster which corresponds to the inner cluster attribute and is available under the cluster exists; and create the inner cluster including the first PAN device, in response to determining that the inner cluster which corresponds to the inner cluster attribute and is available under the cluster does not exist, wherein the first PAN device in the inner cluster is allowed to access information and services from a second PAN device which is included in the cluster and is not included in the inner cluster, wherein the second PAN device is not allowed to access information and services from the first PAN device in the inner cluster, wherein the inner cluster attribute indicates a type of device suitable to provide the service for the user or a type of device that is located in a geographical area suitable to provide the service for the user, and wherein the at least one processor is further configured to: identify a third PAN device having the inner cluster attribute in the cluster of the PAN devices and set a discovery window for discovering PAN devices in the inner cluster based on the service for the user indicated by the inner cluster attribute.

14. The first PAN device of claim 13, wherein the at least one processor is further configured to:

determine a level of security for the inner cluster;

select a wireless channel in a plurality of wireless channels with least data traffic congestion and unused by the cluster;

configure a security to the wireless channel based on the level of security;

select a time window based on the service indicated in the inner cluster attribute, wherein the time window is unused by the cluster;

configure the third PAN device having the inner cluster attribute and the first PAN device with the selected wireless channel for data communication; and configure the third PAN device having the inner cluster attribute and the first PAN device for synchronizing at the selected time window.

15. The first PAN device of claim 13, wherein the at least one processor is further configured to:

select a wireless channel in a plurality of wireless channels assigned to the inner cluster for data communication; and select a time window assigned to the inner cluster for synchronizing at the selected time window.

16. The first PAN device of claim 13, wherein the at least one processor is further configured to:

broadcast the inner cluster attribute to a fourth PAN device in the cluster of the PAN devices through a plurality of wireless channels;

receive a response from the fourth PAN device, wherein the response indicates whether the fourth PAN device has the inner cluster attribute; and perform at least one of:

determining that the inner cluster corresponding to the inner cluster attribute is available under the cluster when the fourth PAN device has the inner cluster attribute, and determining that the inner cluster corresponding to the inner cluster attribute is not available under the cluster when the fourth PAN device does not have the inner cluster attribute.

\* \* \* \* \*